(12) United States Patent
Barnett, Jr.

(10) Patent No.: US 9,464,661 B2
(45) Date of Patent: Oct. 11, 2016

(54) PONY ROD, CONNECTING ROD, AND CROSSHEAD ASSEMBLIES AND METHOD

(71) Applicant: W. H. Barnett, Jr., Fort Worth, TX (US)

(72) Inventor: W. H. Barnett, Jr., Fort Worth, TX (US)

(*) Notice: Subject to any disclaimer, the term of this patent is extended or adjusted under 35 U.S.C. 154(b) by 908 days.

(21) Appl. No.: 13/628,619

(22) Filed: Sep. 27, 2012

(65) Prior Publication Data

US 2014/0086769 A1 Mar. 27, 2014

(51) Int. Cl.
*F04B 19/22* (2006.01)
*F16C 5/00* (2006.01)
*F04B 53/14* (2006.01)

(52) U.S. Cl.
CPC .............. *F16C 5/00* (2013.01); *F04B 53/144* (2013.01); *F04B 53/147* (2013.01); *Y10T 29/49238* (2015.01); *Y10T 74/2142* (2015.01)

(58) Field of Classification Search
CPC ............... F16J 1/005; F16J 1/04; F16J 1/09; F16J 7/00; F04B 19/22; F04B 53/147
See application file for complete search history.

(56) References Cited

U.S. PATENT DOCUMENTS

| | | | | |
|---|---|---|---|---|
| 2,865,663 A | * | 12/1958 | Shellman et al. | 403/24 |
| 4,434,816 A | * | 3/1984 | Di Giovanni et al. | 138/109 |
| 4,508,019 A | * | 4/1985 | Kabele et al. | 92/158 |
| 5,245,913 A | * | 9/1993 | Kato | F02F 3/00 123/193.6 |
| 5,564,327 A | * | 10/1996 | Sims | 92/172 |
| 6,113,304 A | * | 9/2000 | Tremoulet et al. | 403/301 |
| 8,240,039 B2 | * | 8/2012 | Kondoh et al. | 29/888.04 |
| 2010/0242720 A1 | * | 9/2010 | Matzner | F16C 5/00 92/139 |
| 2010/0260631 A1 | | 10/2010 | Kugelev | |
| 2013/0242720 A1 | * | 9/2013 | Chou | 370/221 |

FOREIGN PATENT DOCUMENTS

GB 000274520 A * 2/1928

* cited by examiner

*Primary Examiner* — Logan Kraft
(74) *Attorney, Agent, or Firm* — Decker Jones, P.C.; Brian K. Yost; Geoffrey Mantooth

(57) ABSTRACT

A pony rod comprises an outer sleeve and a pony rod cap which may be threaded into a threaded shank portion. The pony rod cap may have an outside configuration comprising one or more flat sides. The pony rods may comprise an integral part of crossheads such that pony rod shanks are fixed to the respective crossheads. The crossheads may comprise one or more wear bridges cooperatively coupled with one or more crosshead extension members. A connecting rod is adapted to receive a wear plate such that the wear plate is removably coupled to the connecting rod. A reciprocating pump comprises a multi-piece pony rod assembly. A method of repairing a pump is provided, in which a modified pony rod comprising an outer sleeve is provided and a modified crosshead comprising one or more wear bridges is provided.

27 Claims, 17 Drawing Sheets

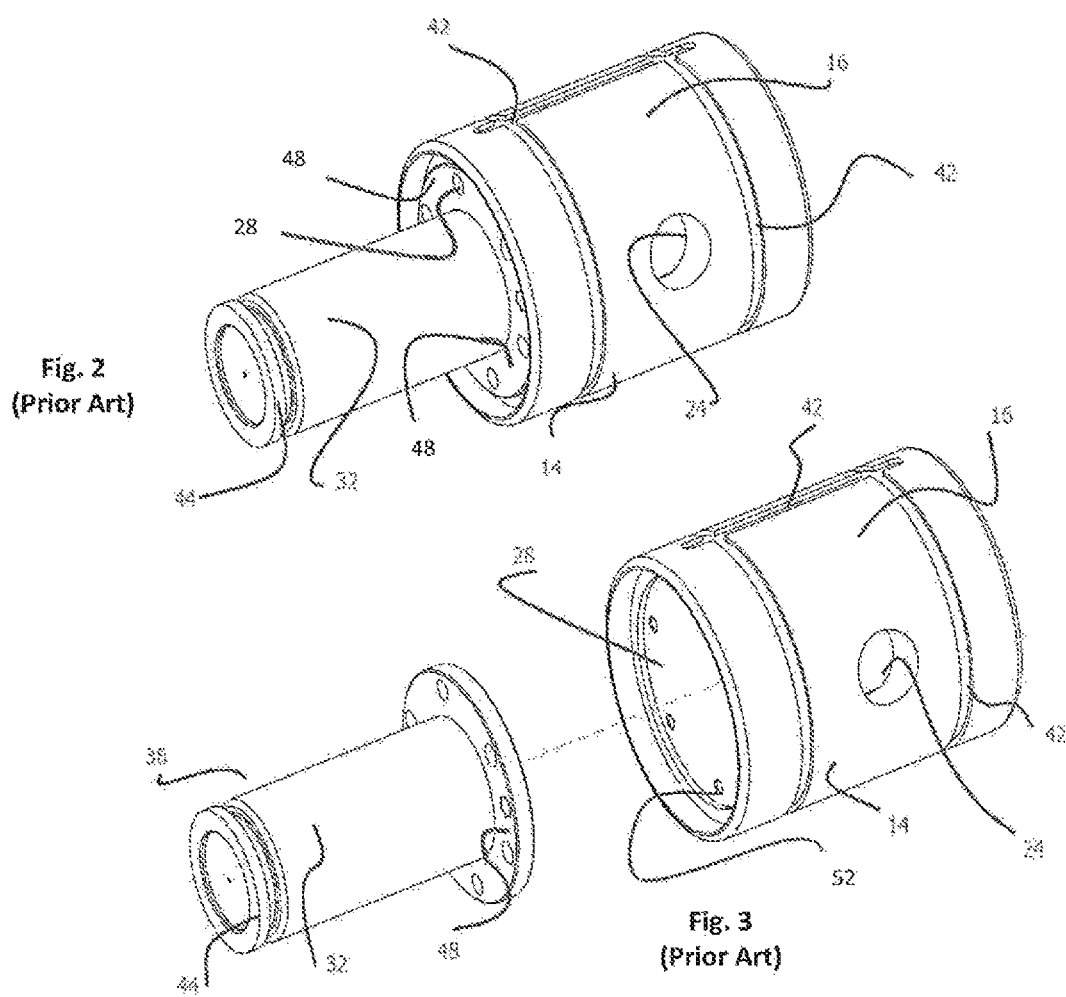

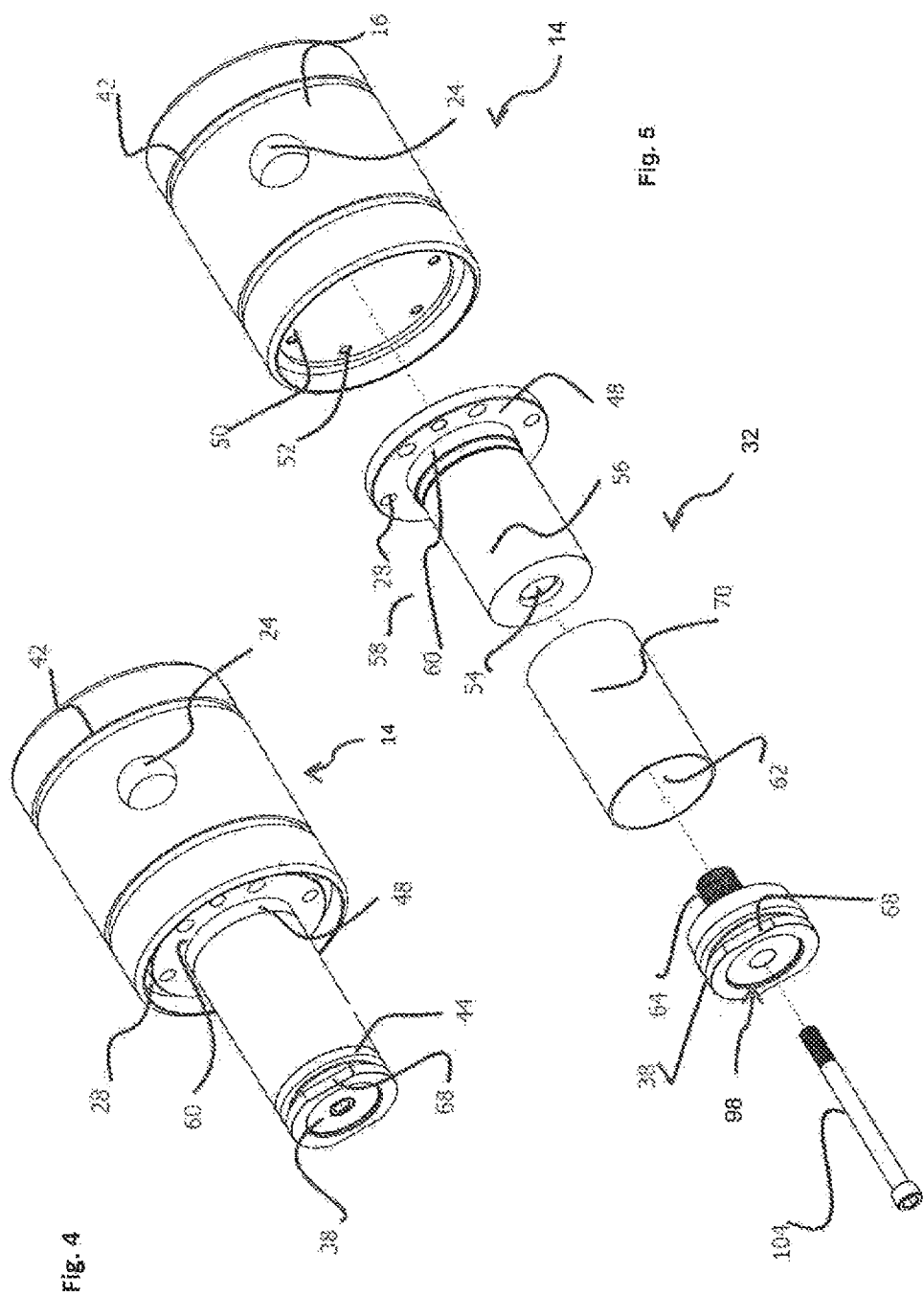

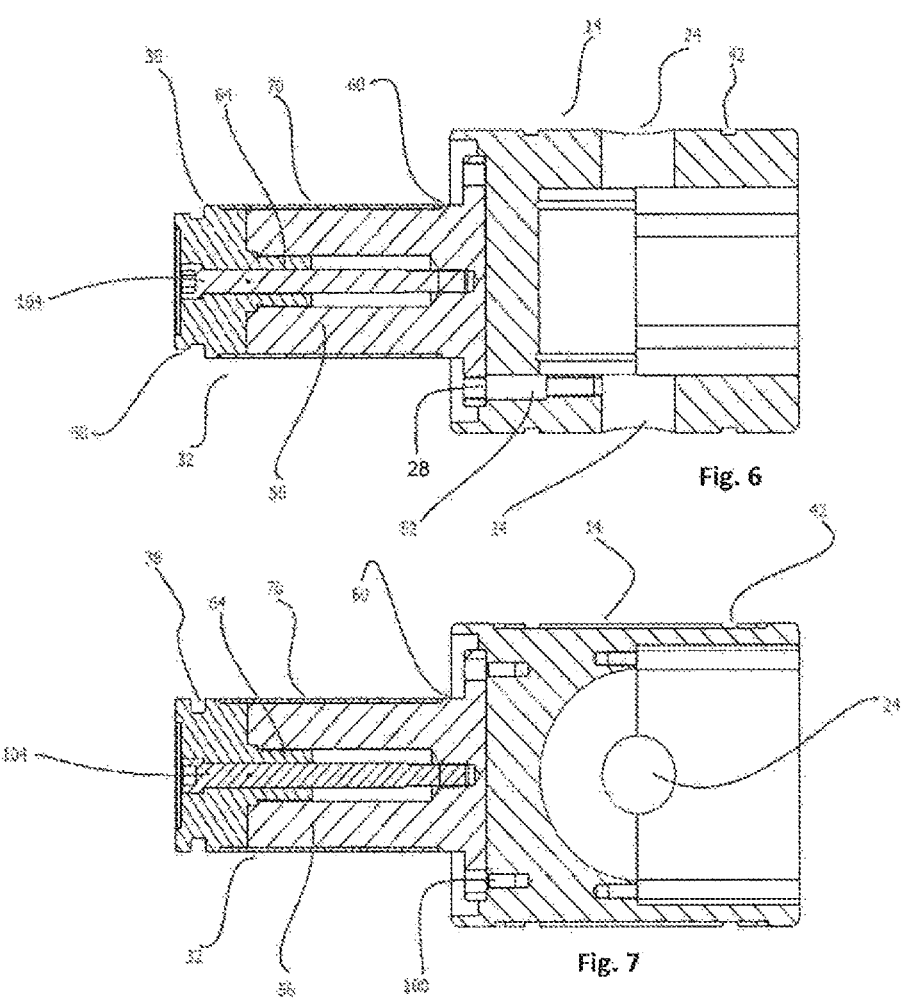

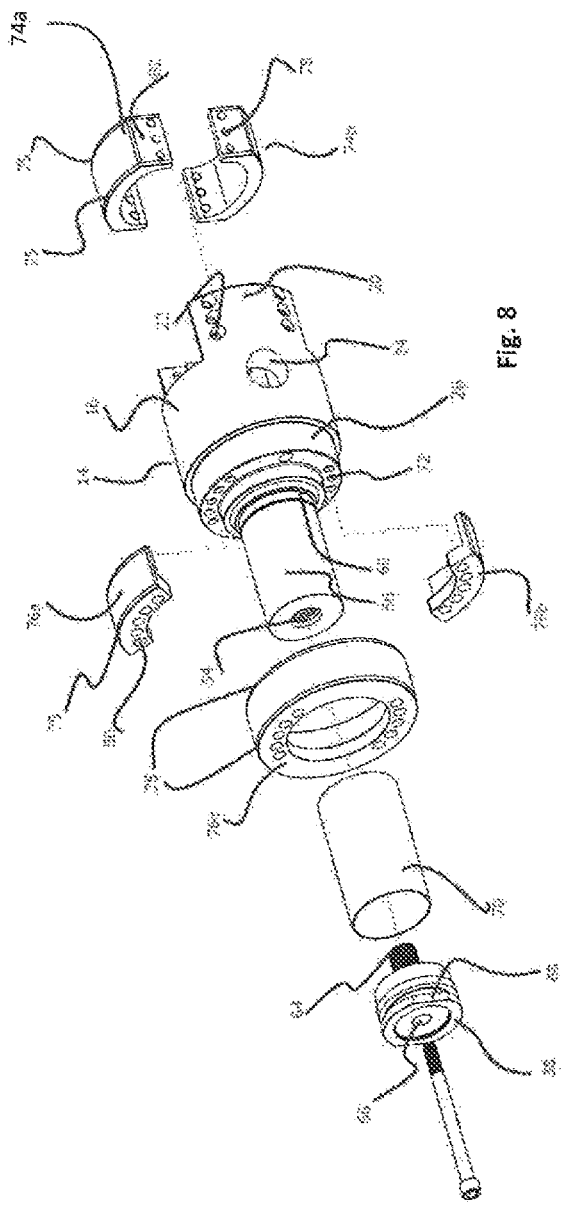

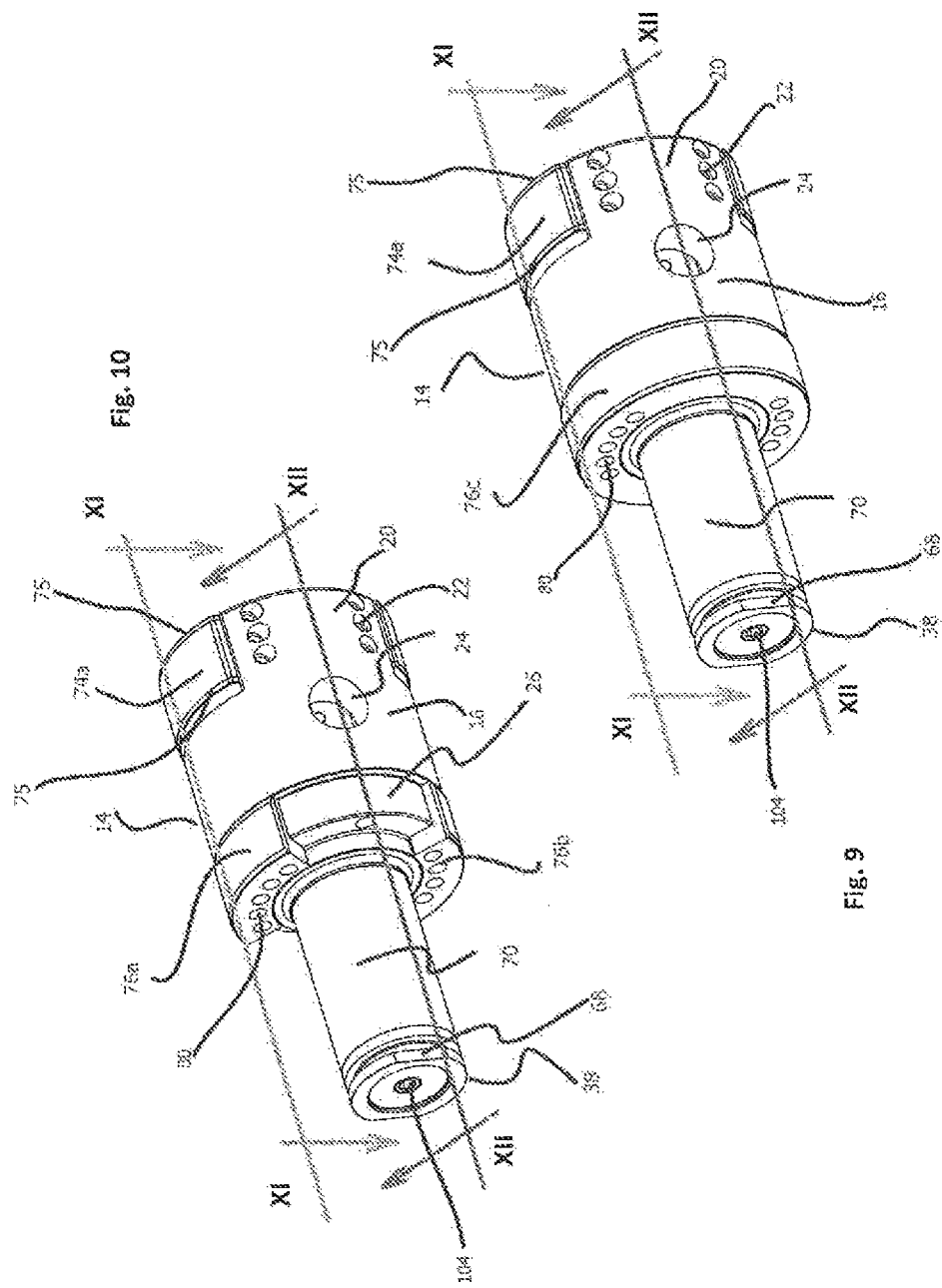

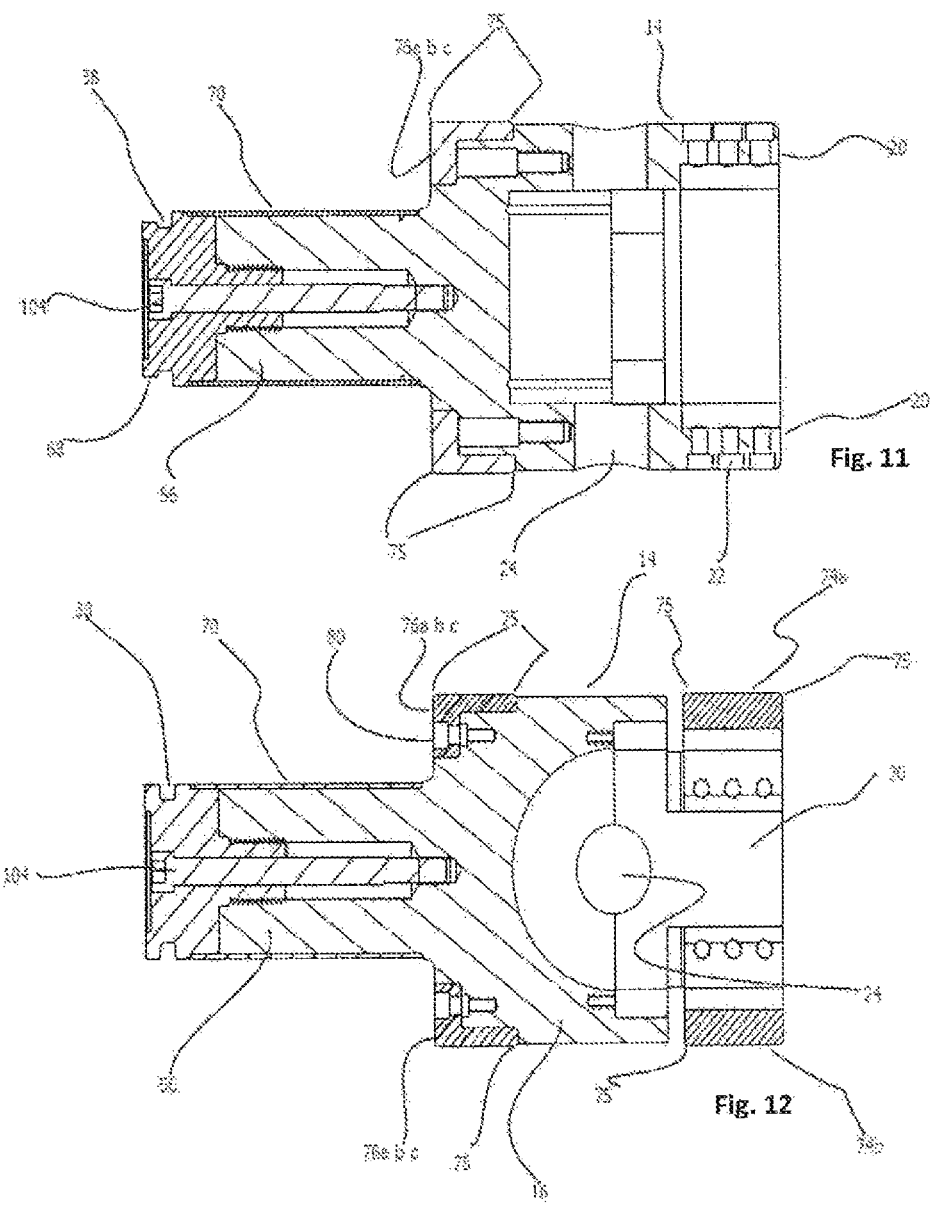

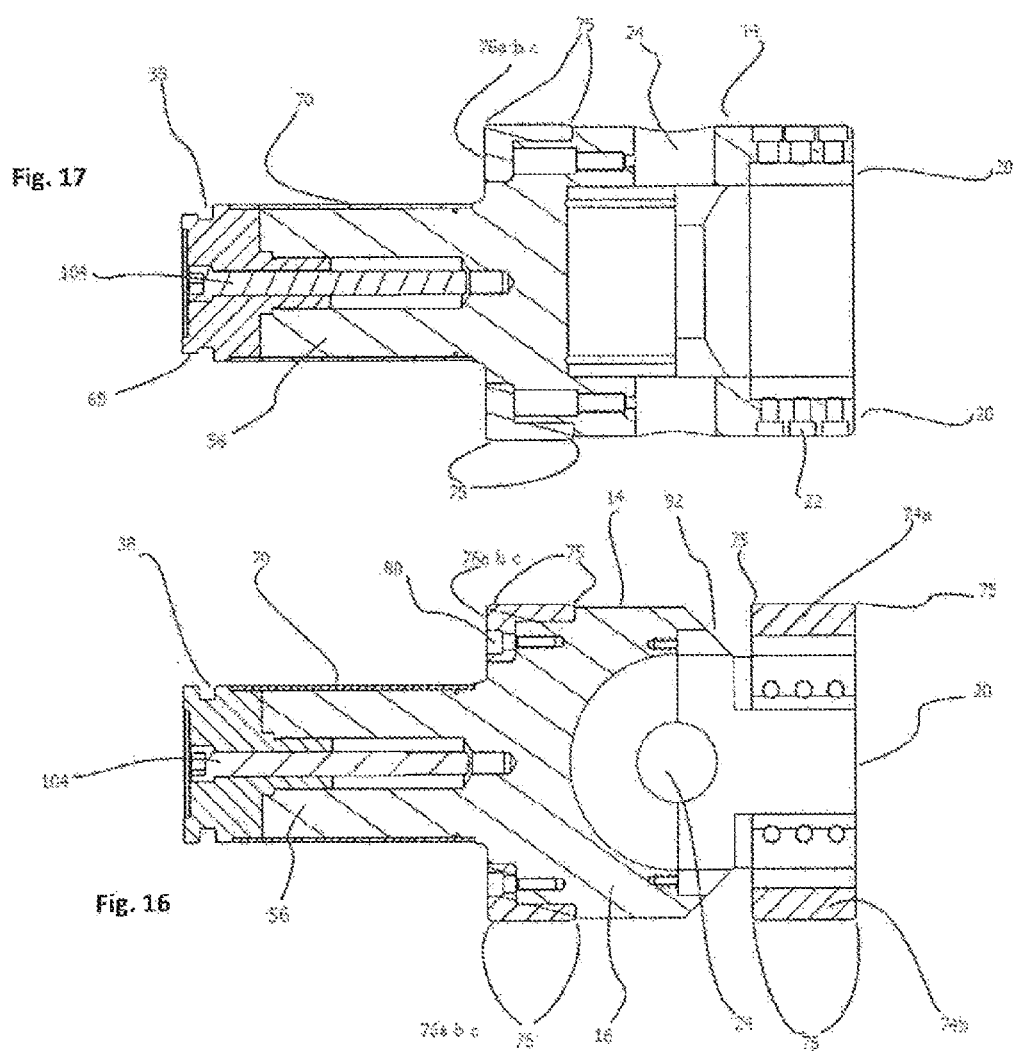

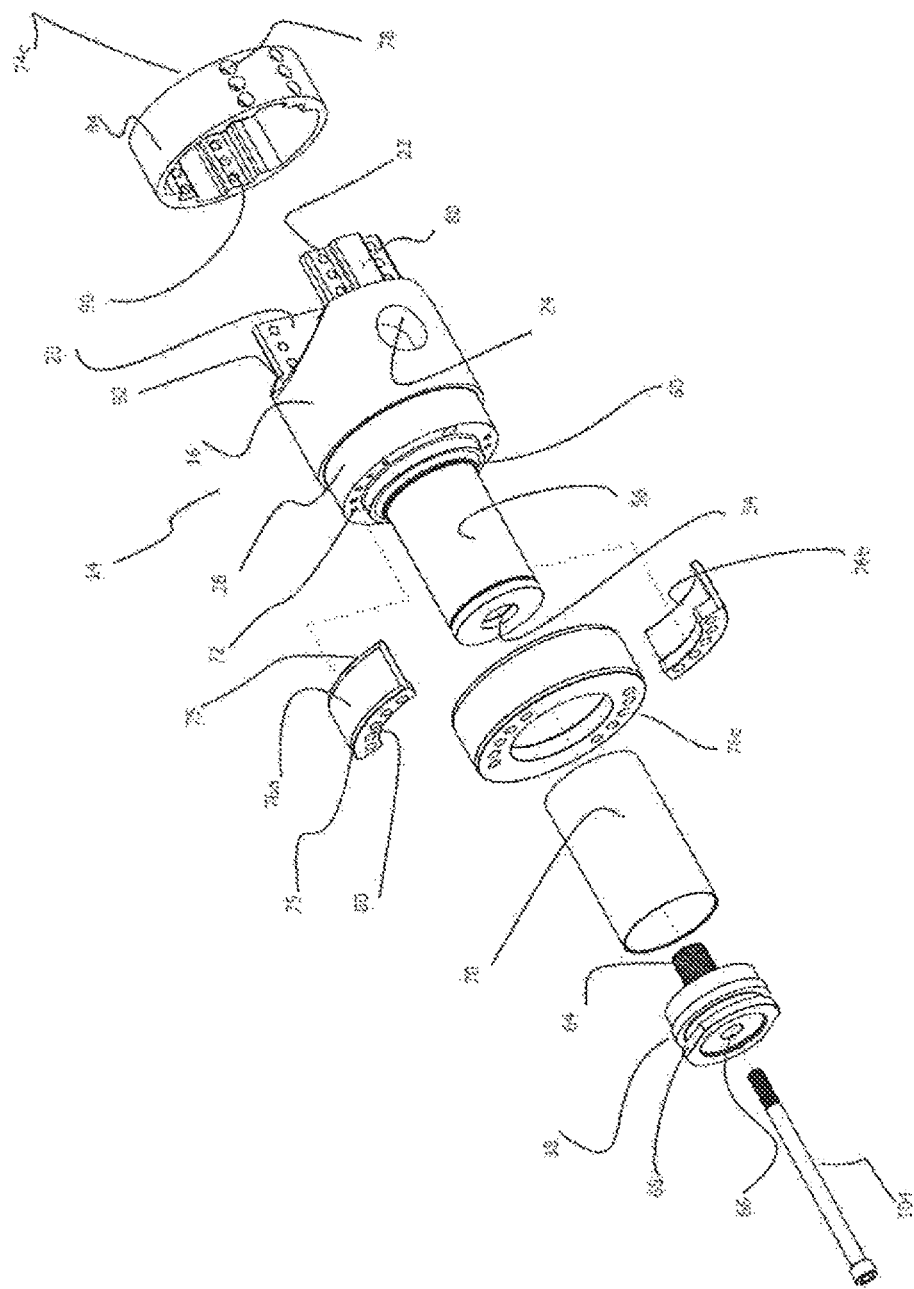

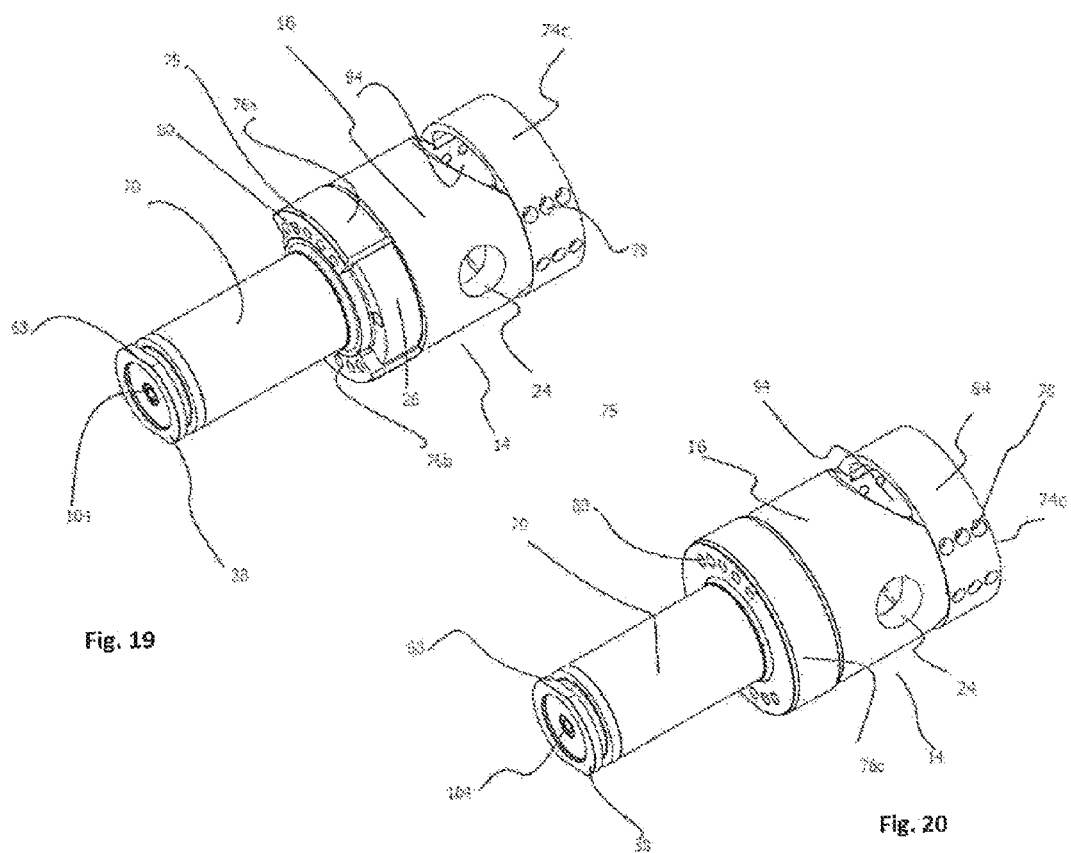

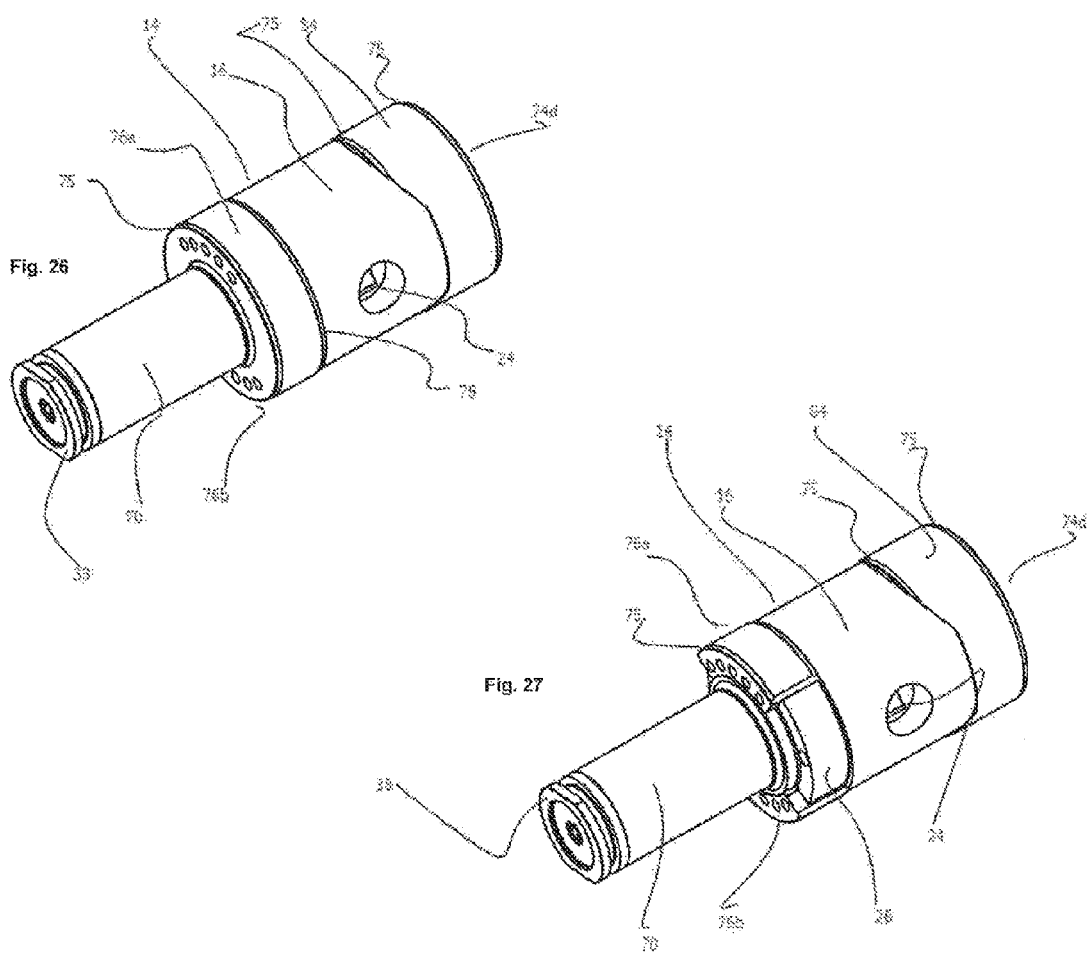

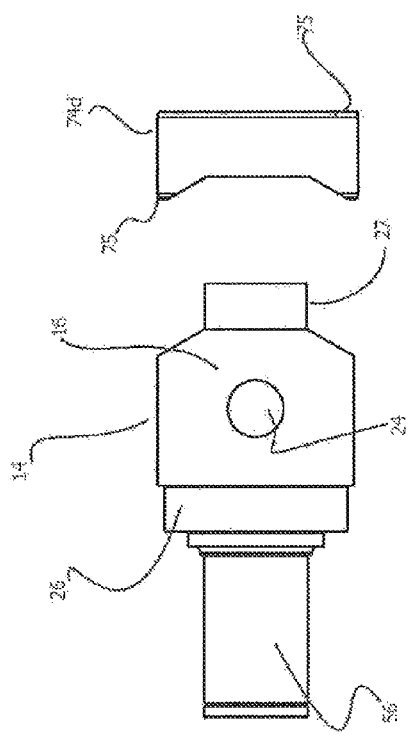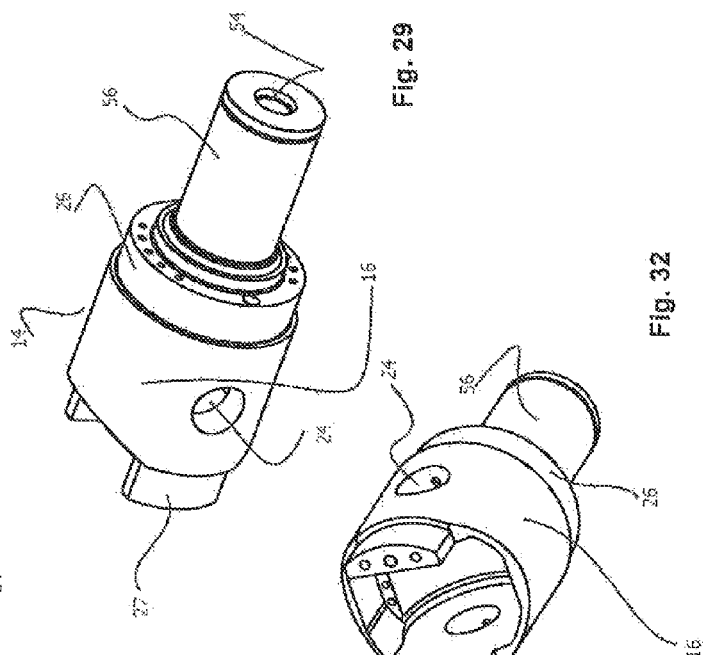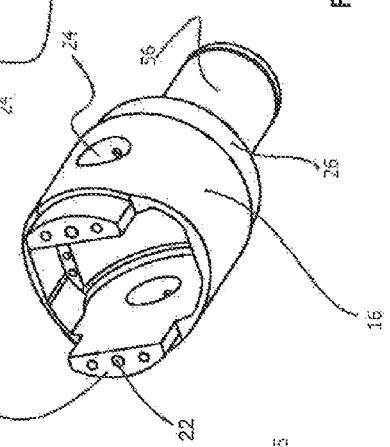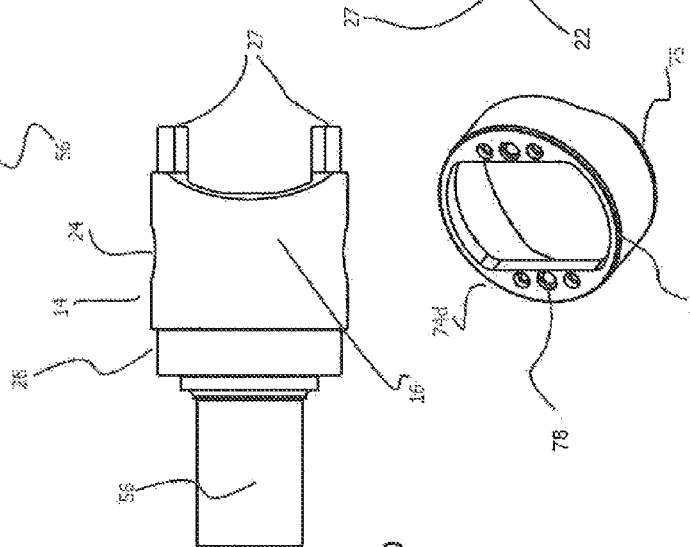

PONY ROD, CONNECTING ROD, AND CROSSHEAD ASSEMBLIES AND METHOD

FIELD OF THE INVENTION

This invention relates in general to pony rods, crossheads, and connecting rods used in plunger type reciprocating pumps and, in particular, to a pony rod, connecting rod, and crosshead assemblies.

BACKGROUND OF THE INVENTION

Hydraulic fracturing (also known as well stimulation) is the injection, under pressure, of water, sand, and/or other fluids within a well formation to induce fractures in a rock layer. Oil and Gas drilling operators commonly use hydraulic fracturing, or "fracing" to release petroleum and natural gas as well as other substances from the rock layer. The high pressure injection creates new channels in the rock which can increase the extraction rates and ultimate recovery of fossil fuels. A hydraulic fracturing pump or "frac pump" is used to pump water, sand, gravel, acids, proprietary liquids and concrete into the well formation. The solids pumped down the hole into the fractures keep the fractures from closing after the pressure is released. Operators generally attempt to pump as much volume as possible at or above the pressure necessary to frac the well.

Fracing is very expensive and generally charged by the hour. Because the formation may be located thousands of feet below the earth's surface, the pressures generated and required by frac pumps are substantial, sometimes exceeding 23,000 pounds per square inch (psi). At peak times, a given frac pump may operate for more than eight consecutive hours (with drive engines running) at as much as 2800 revolutions per minute (rpm).

The frac pump is driven by high horsepower diesel or turbine engines. An engine's revolutions-per-minute (RPM's) are usually reduced through the use of a transmission. The transmission is usually multi-geared such that higher pump loads use lower gearing and lighter loads use higher gearing. Internally, a frac pump increases pressure within a fluid cylinder by reciprocating a plunger longitudinally within the fluid head cylinder. A frac pump comprises two major components: a power frame and a fluid head held together by a group of stay rods. Conventional high pressure, high volume frac pumps have either three or five cylinders. A typical power frame consists of a pinion gear, bull gears, crankshaft, rod caps, connecting rods, crossheads and pony rods. Each crosshead and pony rod is maintained in proper position by a respective large brass cylinder pressed into an individual steel support sleeve welded into the power frame. Each crosshead and pony rod is coupled to the respective connecting rod with a separate wrist pin. Each connecting rod is bolted to individual rod caps that are connected to the crankshaft. The crankshaft is connected to either one or two bull gears that are driven in circular motion by a pinion gear.

As mentioned, in most frac pumps, the connecting rod is attached at one end to the crankshaft, and at the other, the crosshead. The crosshead, in turn, is coupled to the pony rod which is connected to a plunger. The connecting rod is connected to the crosshead by a wrist pin inserted through a wrist pin hole positioned in both the connecting rod and the crosshead. Thus, the crankshaft's rotational movement is transferred through the connecting rod into linear movement by virtue of the sliding arrangement of the crosshead within a brass sleeve. This linear movement, in turn, moves the crosshead and pony rod, which in turn moves the plunger in, on pressure stroke and out on suction stroke, in a linear fashion. Because of the extreme conditions under which a frac pump operates, some of which are discussed above, there is considerable wear and tear on the various component parts. Such wear and tear requires constant maintenance, and ultimately, replacement of worn parts. Maintenance and repair creates machine downtime and increases the overall cost of oil and gas production.

Four of the parts that are susceptible to failure and, thus, machine downtime, are the connecting rod, crosshead, pony rod, and the brass sleeve. As a result of its connection with the crankshaft, the connecting rod transfers the radial energy of the crankshaft into linear motion. The connecting rod may become weakened by the off-center stress produced by the crankshaft rotation. A conventional connecting rod comprises a thicker wall that is required due to its overall straight shank design. Such design and configuration of the conventional connecting rod results in increased weight. Weight is a significant factor for frac pump operators as only so much weight is permitted to be carried down the highway. In operation, an increased weight of moving machine components results in increased horsepower demands. This raises the cost of operation.

The conventional connecting rod has a male knuckle end that, on the compression stroke, pushes against a brass bearing located inside a crosshead female knuckle, and on the suction stroke, pulls against the wrist pin. Due to the loss of oil pressure or poor lubrication of this male/female knuckle arrangement, the connecting rod male knuckle is caused to become worn and/or galled by the brass bearing. Such wear to the male knuckle results in failure and need of replacement of the connecting rod. The connecting rod is very expensive and a difficult part to manufacture due to the configuration of the knuckle end and the way it must be machined. The knuckle end must be ground to the proper size and to a very fine finish so as to move properly against the brass bearing. Because the conventional connecting rod knuckle does not comprise a full circle, proper machining of the knuckle is very time consuming and costly as specialized training and equipment is required.

The conventional crosshead is a casting made of cast iron or steel and is a part that is subject to wear. Virtually all castings are subject to fracturing. The crosshead is pushed and pulled within the brass sleeve which maintains the crosshead in linear alignment. The outside diameter of the crosshead and the brass sleeve within which it travels are each subject to significant wear. The crosshead is in direct contact with the brass sleeve. When the crosshead wears and gets a certain amount of play (loss of fit) the crosshead starts knocking. This, in turn, aggravates wear in the brass cylinder. This wear causes a movement in the connected pony rod which also causes movement in the plunger which, in turn, causes premature loss of the pony rod seal and the pressure seal to the plunger. If the fit of the crosshead is the cause of the play, the crosshead must be replaced. If the brass sleeve is found to be worn, it must be replaced.

Crossheads and brass sleeves are very costly and time consuming to replace. To replace the crossheads or brass sleeves, the pump must be removed from the trailer and entirely disassembled.

To replace the brass sleeves, the empty power frame must be placed on a boring mill and the old brass removed. The steel support cylinder must be machined to "true up" or reconfigure the bore to a proper configuration for proper reinsertion of a replacement brass sleeve. A raw brass tube must be cut to length and turned to a proper diameter for the correct size press fit required to hold the sleeve in place. The brass sleeve must then be placed on a milling machine to have holes or slots milled to allow oil drainage from in front of the crosshead. The brass sleeve is then usually placed in liquid nitrogen (although alcohol and dry ice are also used) so that the brass sleeve is reduced to an extremely low temperature and a point at which it shrinks to a size small enough to be placed within the steel support sleeve. This freezing process is dangerous as it involves a fire hazard and the handling of subzero materials. Under favorable conditions, this process usually takes approximately thirty minutes per cylinder. However, upon reinsertion, the replacement brass sleeve sometimes locks up before reaching the proper depth or position and must be cut out and re-replaced at more cost and time. Once the brass sleeve is properly installed, the power frame must again be positioned on a boring mill so that the brass sleeve inside diameter may be bored back to factory specifications. To prevent future oil leakage in this area, the brass sleeve ends must then to be machined so that they are flush with the head plate of the power frame. Replacement of the brass sleeve is the most time consuming portion of the power frame rebuilding process.

As may be seen from the foregoing, in order to replace the brass sleeves, the pump has to be completely disassembled and handled several times on and off different machines. This is a very time consuming, costly and resource intensive operation. To prevent pumping operations from becoming interrupted for prolonged periods of time as a result of brass sleeve replacement, pump owners must purchase more pumps than would otherwise be necessary.

Just as the crosshead and brass sleeves are subject to wear and require replacement, the pony rod is also a part that may require replacement due to wear. The pony rod is clamped to the plunger located in the fluid head. The pony rod is used to transfer the linear motion of the crosshead to the plunger in the fluid head. On the in stroke of the pony rod, the plunger is pulled out causing a suction opening of the intake valve. Such suction opening of the intake valve pulls fracing fluids into the fluid head. On the out stoke of the crosshead, the plunger closes the intake valve and opens an exhaust valve. Such action pushes the fluid in the fluid head out to the wellhead under pressure.

The conventional pony rod is bolted to the crosshead as a separate part. The pony rod transfers energy produced in the crank case to the plunger. Due to its contact with the seal that seals off the pony rod to oil leakage from the power frame and exposure of the pony rod to the outside elements such as dust, acids, fracing fluids, etc., the pony rod is subject to significant wear. The pony rod can also come loose from the crosshead due to the bolts loosening, which can cause catastrophic failure of the frac pump.

In order to extend the life of a pony rod, in the original manufacture, a wear area of the pony rod is undercut, and spray metalized with powdered hard metal. The pony rod is then heat treated so as to bond the metalized surface together. Then the metalized surface is machined in a grinding machine to proper diameter and finish to fit the seals.

After becoming worn, the conventional pony rod can be re-machined. To do so, the old hard surface must be removed by grinding, and re-metalized, heat treated and machined or ground back to proper size. These worn pony rods are usually exchanged for either a rebuilt pony rod or a new one. The metalizing operation of both new and used pony rods requires a large amount of labor, time, and resources. The pump must be disassembled to replace the pony rod. Moreover, a stock pony rod deteriorates each time it is subjected to high temperature by both spraying of metal and heat treatment of the sprayed on surface to make the sprayed metal bond to itself. Each time steel is heated to high temperatures there is a loss of material through oxidation (scale), warping of the metal and softening of the steel. The high heat elongates the grain of the material. Longer grain generally equates to softer steel while smaller grain generally equates to harder steel. The pony rod steel may become soft enough so as to be unable to carry sufficient loads. Also soft steel may result in damage to the clamp end of the pony rod, which calls for complete replacement of the unit. Reworked pony rods have a much higher failure rate. The buyer buys a reworked pony rod to save money but never knows how many times it has been reworked. The buyer may be unaware that a reworked pony rod life is not as long as a new one. In the event of premature failure of a reworked pony rod, the frac pump must again be torn down for replacement. Though conventional pony rods are discarded when a new pump is bought, the pony rods of the present invention may be reused in new pumps. The higher the pressure at which a frac pump runs, the shorter the life of the power frame. Conversely, lower operating pressures extend the life of the power frame. The power frames are heavily stressed during operation. The average power frame is rebuilt up to four times. Power frames running 15,000 lbs. pressure or more last two to three rebuilds. Normal life is between 800 to 1000 hours between rebuilds. The frac pump requires constant monitoring during operation for a multitude of failures that can happen while in operation.

Due to the long rebuild turnaround, operation under less than ideal conditions, and high maintenance costs, frac pump owners inevitably must "over buy" frac pumps to compensate for the number of pumps being out of service. The power frame is the most expensive part of the frac pump. When a power frame is retired, it is sold as junk. An owner replaces the old with a complete new power frame. No old parts are used in the new power frame.

The present invention provides tremendous savings to the user in both rebuild cost and an increase in turnaround time which lowers the quantity of inventory of frac pumps needed to be kept on hand because of rebuilding delays. These delays result from turnaround times that can be as high as six months due to waiting for parts or finding machine time to machine the rebuilds on.

The invention eliminates the need for a large number of brass sleeves to be manufactured and saves on tooling for extra machine work, electricity and many other intangibles.

A replaceable pony rod sleeve is provided that can be replaced in the field without disassembling or "tearing down" the machine. The replacement of the pony rod sleeve is fast and inexpensive compared to the normal replacement method which requires the pump to be taken out of service and completely disassembled. The pony rod sleeve contributes to keeping the pump in the field, thus, lowering operation cost not only because of decreased cost involved with replacement but by reducing the need for more inventory to compensate for rebuilding delays.

The present invention provides large savings in obviating or reducing the need to replace the brass sleeves through which crossheads travel. If either the outside diameter of the crosshead or the inside diameter of the brass sleeve become sufficiently worn such that they would ordinarily require replacement, the present invention, eliminates this requirement by providing replaceable wear bridges that may be used in a re-machined existing brass sleeve. The original brass sleeve is bored out to a minimum clearance and configuration, and replacement wear rings are provided, the wear rings being oversized such that wear rings bring back the original clearance between the two parts. The brass sleeves do not have to be replaced during the normal life of the power frame.

By providing a pony rod as an integral part of the crosshead significant weight is saved and the pony rod cannot come loose as in the conventional crosshead and bolted on pony rod. In the event the pony rod should come loose, a complete loss of the frac pump could occur resulting in the need to replace the entire pump or at least repair major damage.

The main body of the combination crosshead and pony rod may be reused through several generations of new power frames because everything that can wear out can be replaced. There is no further heat treatment of the body combination crosshead and pony rod, other than the original heat treatment, which greatly increases life of the unit. This invention brings a value not previously seen or offered. There is a much lower cost of operation, reusable parts in the next new machine purchase and much faster turnaround times which also has the benefit of the need for fewer pumps in inventory.

The connecting rod provided in this disclosure attaches to the crankshaft in a similar manner as a conventional connecting rod. However, the modified connecting rod of an embodiment of the present invention comprises a tapered shank instead of a straight shank of the conventional design. As the crankshaft rotates the connecting rod is placed under great stress by the off center push of the crankshaft. The tapered shank of the connecting rod is much stronger than the straight design of the stock connecting rod and puts the wall of the connecting rod more in line with the stress of the pressure stroke. The tapered body also allows a thinner wall, because of its design advantage, and is less likely to break or deflect than the straight design with a good strength advantage. The tapered body has a weight advantage. The bearing end of the connecting rod is a thick walled cylindrical cylinder laying perpendicular to the length wise center of the cross head. It is commonly called a knuckle end. This design is used because it offers more square inches of surface area to handle the tremendous pressures involved in the pressure stroke of the frac pump. The knuckle end pushes a brass or plated steel bearing located inside the crosshead. Lubrication travels through an access hole in the top side of the crosshead, then through the bearing. The knuckle end has a small hole drilled through the top center intersecting the larger hole bored thru lengthwise of the knuckle end. This hole allows access of lubrication to lubricate the wrist pin hole. Due to poor lubrication, loss of oil pressure, worn bearing or worn knuckle end of the connecting rod, the metal between the two surfaces, bearing and knuckle end, can gall or deform. A loss of this bearing causes deformation of the knuckle end of the connecting rod. When there is damage to the knuckle end the connecting rod is replaced at a great cost. The stock knuckle end is not a full circle but requires a very smooth and accurate surface. If this surface is not formed to precise specifications, the bearing may be damaged very quickly which leads to premature pump failure.

Grinding the knuckle end cannot be performed in a full circle. The semicircle machining requirement of the conventional connecting rod requires a specialized grinder to grind the radius of the stock knuckle end and maintain the accuracy required of the part. This grinding operation is slow and very costly.

In a preferred embodiment of the present invention, the wear surface of the knuckle end part of the connecting rod is replaceable. The replaceable sleeve is easy to machine and install. The replaceable sleeve does not require any special machinery and is easily made in mass quantities. The sleeve is made as a thin walled cylinder either heat treated, hard chrome plated, or with other plating options. The replaceable sleeve is ground around a full circle which does away with special machinery, speeds up production and greatly lowers the cost of the sleeve. The replaceable sleeve is then cut to fit the modified cut knuckle end. The finish of the replaceable sleeve becomes the part that facilitates smooth operation rather than knuckle end itself.

The design of the present connecting rod is stronger than a conventional connecting rod and less susceptible to breakage. As the knuckle end is replaceable, there will be no loss of the rod because of wear, loss of oil pressure, galling, or deformation. The new connecting rod can be used in the next new frac pump because of its design and replaceable end. There is nothing to wear out the connecting rod. All of these attributes have a very good cost advantage require less labor than conventional connecting rods and provide a savings in terms of natural and manmade materials.

SUMMARY OF THE INVENTION

The present invention in its various embodiments and aspects of such embodiments provides crosshead, pony rod, and connecting rod assemblies which are lighter, will last longer, require less maintenance, and which, when the need arises may be easily repaired or replaced.

In one embodiment, the pony rod comprises a multi-piece assembly and comprises a pony rod base comprising a shank portion and flange. The flange further comprises coupling openings cooperatively arranged to allow coupling of the pony rod base to a receiving portion of the crosshead which comprises crosshead coupling openings. The pony rod shank comprises an elongated cylindrical material further comprising a threaded opening arranged to receive a pony rod cap comprising a threaded post. The pony rod shank is further adapted to receive a pony rod sleeve. The pony rod sleeve comprises an elongated, hollow, cylindrical material comprising an inside diameter slightly larger than an outside diameter of the pony rod shank. The pony rod base further comprises a flange ring at a junction between the flange and pony rod shank. The flange ring has approximately the same size outside diameter as the pony rod sleeve such that when the sleeve is placed in position around the pony rod shank, the flange ring locates the sleeve and the sleeve and flange ring are flush with one another. In this embodiment, the pony rod sleeve has the same outside diameter as the as that of a conventional prior art pony rod.

In other embodiments, the outside surface of the pony rod sleeve or shank can be treated different ways to enhance wear resistance. For instance, the pony rod sleeve or shank may be heat treated to a high hardness, nitride, or plated to enhance wear such as hard chrome or nickel carbide plating.

The length of the pony rod sleeve is longer than the stroke of the assembly. This assures that the seal will wear only on the pony rod sleeve. When the pony rod sleeve is installed properly, a pony rod cap, when sufficiently torqued, helps hold the pony rod sleeve securely and in proper alignment. In a preferred embodiment, a bolt with an opposite thread is tightened through the center of the pony rod cap to keep the cap from loosening. If the end of the conventional pony rod cap is damaged the entire pony rod is generally discarded. However, if the pony rod cap of the present invention is damaged it may be replaced, without disassembling the pump, at a great cost savings to the user.

The pony rod sleeve can be replaced in the field without a tear down of the machine. The replacement of the pony rod sleeve is fast and very inexpensive compared to the normal replacement method which requires the pump being taken out of service and completely disassembled. The pony rod sleeve contributes to keeping the pump in the field, thus, lowering cost to the owners not only because of decreased cost involved with replacement but by reducing the need for more inventory to compensate for rebuilding delays.

In this embodiment, the rear wear bridges are partially semi-circular pieces of material comprising arched surfaces. These arched surfaces comprise an outside arc slightly larger than an outside arc of the crosshead cylinder and sides. When originally mounted on the crosshead, the rear wear bridges are slightly raised with respect to the crosshead in the areas on the top and bottom of the crosshead. The rear wear bridge sides nest within the crosshead cylinder adjacent to the crosshead extensions. At the end closest to the pony rod shank, the crosshead of this embodiment is further adapted to receive one or more circular or semi-circular front wear bridges.

However, the wear bridges need not be so positioned. For example, in the event the brass sleeve of the crosshead housing becomes deformed or worn and would ordinarily need to be replaced with the time consuming, and expensive process described above, the wear bridges of the present invention in various embodiments largely eliminate or reduce the need for such an arduous process. Rather, the worn brass sleeve of the crosshead housing may be easily machined to accommodate a larger crosshead diameter. Replacing one or more wear bridges with higher profile wear bridges effectively increases the diameter of the crosshead such that there is no need to replace the brass sleeve of the crosshead housing.

In another embodiment of the present invention, the unified crosshead and pony rod shank assembly comprises a scalloped crosshead cylinder portion. In this embodiment, an opening between the rear wear bridges and the crosshead cylinder remains on the top and bottom of the crosshead after coupling the crosshead cylinder with the rear wear bridge.

In another embodiment of the present invention, dovetail tails on either side of the rear wear bridge are arranged for cooperative coupling with dovetail pins of the crosshead cylinder. The rear wear bridge of this embodiment is adapted to slide over crosshead extensions and be held securely in a desired position by the dovetail arrangement and coupling devices such as screws.

In embodiments comprising a threaded opening arranged to receive the pony rod cap threaded post, the internal thread of the threaded opening and the external thread of the threaded post are left handed. A right hand safety bolt allows each threaded item to work against each other to keep them tightly working against each other. It is easier to machine a left hand thread than to purchase a left handed bolt which keeps costs down.

In other embodiments, the pony rod cap comprises one or more flat sides adapted to receive a conventional tool such as a wrench or socket. Such flat sides permit the pony rod cap to be easily torqued into place or removed.

In another embodiment, the modified crosshead assembly is adapted to receive a modified connecting rod. The connecting rod of this embodiment comprises a connecting plate, an elongated portion, a wrist pin receiver (commonly called a knuckle end), a wrist pin hole, and a wear plate. The connecting plate is adapted to be mounted on the crankshaft. The elongated portion spans between the connecting plate and the wrist pin receiver. The wrist pin receiver is tubular in shape having a rounded exterior configuration and a hollow interior portion comprising the wrist pin hole adapted to receive a wrist pin which secures the connecting rod to the crosshead. The wear plate comprises a "C" shaped configuration with a generally rounded interior surface conforming to the contours of an outside portion of the wrist pin receiver such that the wear plate may be mounted onto the wrist pin receiver and held in place by tacking, staking, gluing, etc. In this embodiment, the connecting rod comprises a tapered hollow cylinder.

In another embodiment, the connecting rod is comprised of a flange end, tapered shank, a knuckle or barreled end having a large bore lengthwise that a brass bushing and wrist pin fit into. At the top dead center of the knuckle end is a smaller opening or hole extending to the wrist pin hole. Through the wall of the steel support and brass sleeve is a pipe threaded through hole. A threaded oil line is positioned within this pipe thread. When the oil pump to the frac pump is operated, an oil stream is caused to enter the brass sleeve that holds the crosshead. The hole is located at the top of the horizontal cylinder near the middle of the brass sleeve. There is a hole drilled through the side if the crosshead that is drilled down to the center of the crosshead just in front of the brass bearing fit on the inside of the crosshead. A hole is drilled through the center of brass bearing fit intersecting the hole drilled through the side of the crosshead. As the crosshead travels back and forth within brass sleeve, the crosshead travels beneath the oil stream. The oil stream turns into the intersecting bearing hole, thus lubricating the bearing and traveling through the small hole in the top of the connecting rod and lubricating the wrist pin.

In the combination crosshead, the open area between the body and the rear wear ring allows more oil be injected into the bearing area thus enhancing the lubrication to the bearing. In conventional assemblies, lubrication in this area is very poor. The added lubrication provided by the present invention is an improvement over conventional assemblies and facilitates longer running time of the frac pump and a savings of time and money.

In a preferred embodiment, the connecting rod attaches to the crankshaft in a similar manner as a conventional connecting rod. However, the modified connecting rod of this embodiment comprises a tapered shank instead of a straight shank of the conventional design. The tapered shank of the connecting rod is much stronger than the straight design of the stock connecting rod. The tapered body also allows a thinner wall, because of its design advantage, and is less likely to break or deflect than the straight design with a good strength advantage. The tapered body has a weight advantage.

The knuckle end of the connecting rod is a thick walled cylindrical cylinder laying perpendicular to the length wise center of the cross head. This design is used because it offers more square inches of surface area to handle the tremendous pressures involved in the pressure stroke of the frac pump. The knuckle end has a small hole drilled through the top center intersecting the larger hole bored thru lengthwise of the knuckle end. These holes lubricate the wrist pin hole.

In a preferred embodiment of the present invention, the wear surface of the knuckle end part of the connecting rod is replaceable. The replaceable sleeve is easy to machine and install. The replaceable sleeve does not require any special machinery and is easily made in mass quantities. The sleeve is made as a thin walled cylinder either heat treated, hard chrome plated, or with other plating options. The replaceable sleeve is ground around a full circle which does away with special machinery, speeds up production and greatly lowers the cost of the sleeve. The replaceable sleeve is then cut to fit the conventionally cut knuckle end. The finish of the replaceable sleeve becomes the part that facilitates smooth operation rather than knuckle end itself.

In another embodiment of the present invention the crosshead comprises a unified crosshead and pony rod shank assembly wherein the pony rod and crosshead are integrally formed. The crosshead of this embodiment comprises a crosshead cylinder portion comprising a wrist pin hole, one or more crosshead extensions, and a wear bridge mounting surface. At an end closest to the connecting rod, the crosshead of this embodiment is adapted to receive one or more rear wear bridges.

In another embodiment of the present invention, a reciprocating pump comprises a crankshaft, a connecting rod, a crosshead, a pony rod, and a plunger. The plunger pumps fluid through the fluid cylinder chamber. The plunger is connected, at one end, to the pony rod. The pony rod is connected to the crosshead. The crosshead is connected to the connecting rod which is connected to the crankshaft. The connecting rod, crosshead, pony rod, and plunger are moved linearly by the crankshaft's rotational movement. The crosshead comprises a multi-piece assembly, comprising a cylinder portion, a wrist pin hole, one or more threaded openings, and an integrated pony rod.

In one embodiment, the pony rod is an integral part of the crosshead such that a pony rod shank is fixed to the crosshead.

In one embodiment, the crosshead comprises one or more rear wear bridges.

In one embodiment, the one or more rear wear bridges may be cooperatively coupled with one or more crosshead extension members.

In one embodiment, the crosshead comprises forward wear bridges.

In one embodiment, the crosshead has a forward recessed mounting portion.

In one embodiment, the pony rod comprises a forward wear ring.

In one embodiment, the pony rod comprises an outer sleeve.

In one embodiment, the pony rod comprises a pony rod cap portion which may be threaded into a threaded shank portion.

In one embodiment, the pony rod cap portion has an outside configuration comprising one or more flat sides.

In one embodiment, the multi-piece pony rod assembly may be coupled with a conventional crosshead.

In one embodiment, the multi-piece pony rod assembly may be coupled to the multi-piece crosshead assembly.

A method of repairing a pump is provided, the method comprising the steps of: providing a pony rod comprising a pony rod base comprising a flange and a pony rod shank; the pony rod shank being coupled to a receiving portion of the crosshead; a first pony rod sleeve being positioned about the pony rod shank such that the pony rod shank is within a hollow portion of said first pony rod sleeve; a pony rod cap threaded post being threaded into the pony rod shank threaded opening; removing the pony rod cap from the pony rod shank; removing the first pony rod sleeve from the pony rod shank; placing a second pony rod sleeve about the pony rod shank such that the pony rod shank is within a hollow portion of said second pony rod sleeve; and replacing the a pony rod cap.

In another embodiment, a method of repairing a pump is provided, the method comprising the steps of providing a crosshead comprising a crosshead cylinder portion comprising a wrist pin hole, a wear bridge mounting surface; the crosshead having a first rear wear bridge mounted on the wear bridge mounting surface; removing the first rear wear bridge from said wear bridge mounting surface; and mounting a second rear wear bridge on said wear bridge mounting surface.

In another embodiment, a method of repairing a pump is provided, the method comprising the steps of providing a crosshead comprising a crosshead cylinder portion comprising a wrist pin hole, a wear bridge mounting surface; the crosshead having a first front wear bridge mounted on the wear bridge mounting surface; removing the first front wear bridge from said wear bridge mounting surface; and mounting a second front wear bridge on said wear bridge mounting surface.

BRIEF DESCRIPTION OF THE DRAWINGS

FIG. 2 is an isometric view of a prior art pony rod and crosshead assembly.

FIG. 3 is an exploded view of the prior art pony rod and crosshead assembly of FIG. 2.

FIG. 4 is an isometric view of a modified pony rod and crosshead assembly in accordance with a preferred embodiment of the present invention.

FIG. 5 is an exploded view of the modified pony rod and crosshead assembly of FIG.

FIGS. 6 and 7 are cross-sectional views of the pony rod and crosshead assembly shown in FIG. 4.

FIG. 8 is an exploded view of the crosshead and pony rod assembly in accordance with another embodiment.

FIGS. 9 and 10 are isometric assembled views of the crosshead and pony rod assembly of FIG. 8.

FIGS. 11 and 12 are cross-sectional views of the pony rod and crosshead assemblies along the lines XI and XII of FIGS. 9 and 10.

FIGS. 16 and 17 are cross-sectional views along the lines 14 and 15.

FIG. 18 is an exploded view of the crosshead and pony rod assembly in accordance with another embodiment.

FIGS. 19 and 20 are isometric views of the crosshead and pony rod assembly in accordance with preferred embodiments.

FIGS. 26 and 27 are assembled views of the crosshead and pony rod assembly in accordance with preferred embodiments.

FIGS. 28-30 are views of the crosshead and pony rod assembly in accordance with preferred embodiments.

FIG. 31 is an isometric view of the rear wear bridge of FIGS. 26-30.

FIG. 32 is an isometric view of the crosshead and pony rod assembly of FIGS. 26-30 without the rear wear bridge in place.

DETAILED DESCRIPTION OF THE INVENTION

Figure 1:
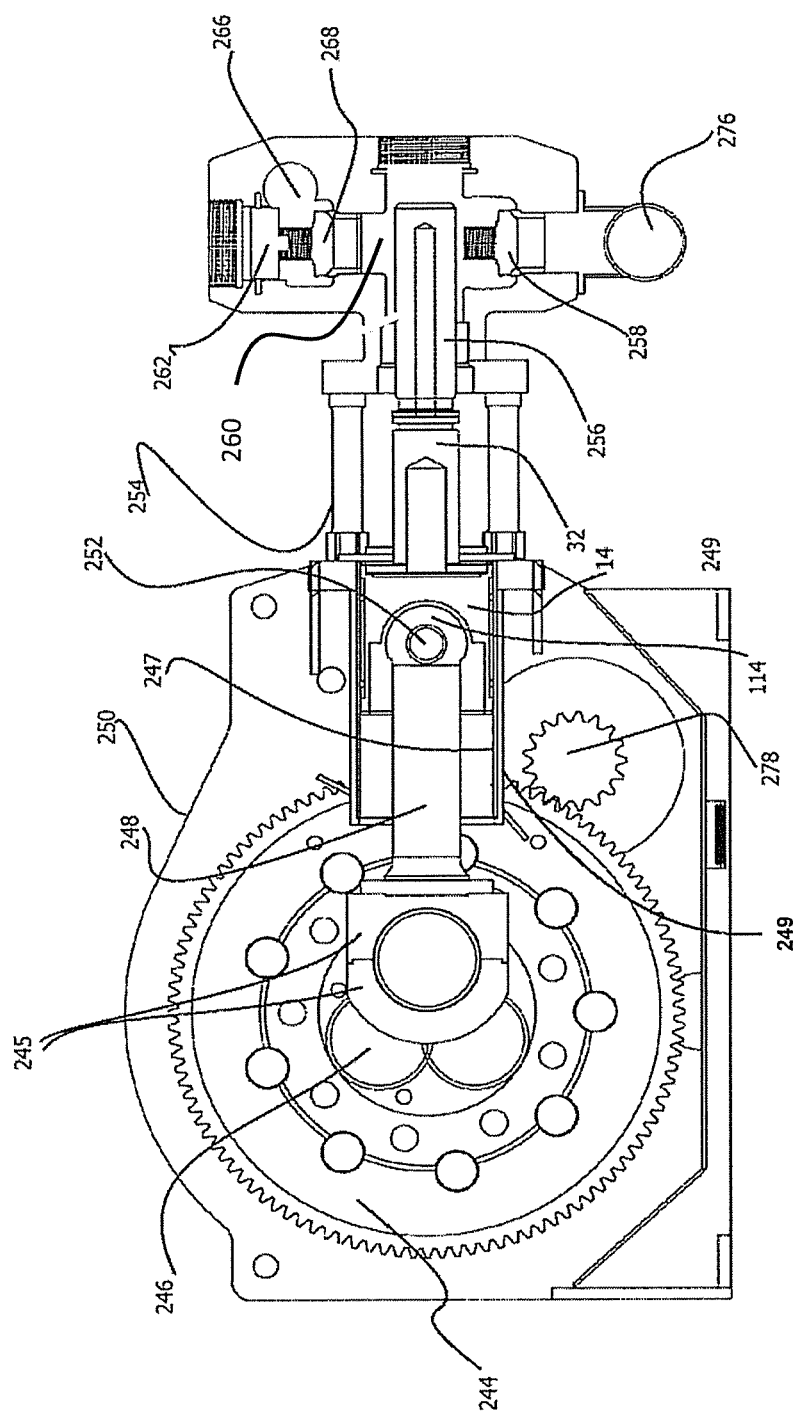
FIG. 1 is a cross-sectional cut-away view of a prior art hydraulic fracturing pump.

The present invention in its various embodiments and aspects of such embodiments provides crosshead 14, pony rod 32, and connecting rod 248 assemblies which are lighter, will last longer, require less maintenance, and which, when the need arises may be easily repaired or replaced. Referring to FIG. 1, there is shown a cross-sectional view of a prior art, hydraulic fracturing pump ("frac pump") assembly. As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment," "certain embodiments," "an embodiment," or similar term means that a particular feature, structure, or characteristic described in connection with the embodiment is included in at least one embodiment of the present disclosure. Thus, the appearances of such phrases in various places throughout this specification are not necessarily all referring to the same embodiment. Furthermore, the particular features, structures, or characteristics may be combined in any suitable manner on one or more embodiments without limitation.

In operation, the conventional frac pump 12 increases pressure within a fluid head 264 having a chamber 260 by reciprocating a plunger 256 longitudinally within the fluid head 264. This plunger 256 action moves fluid through valves 258, 268 in an out of the fluid head 264. The pump 12 comprises a pump housing 250, one or more gears 244, 278, stay rods 254, fluid inlet 276, and fluid outlet 266. To facilitate the movement of the fluid, the pump 12 further comprises a crankshaft 246, connecting rod 248, crosshead 14, and pony rod 32. The connecting rod 248 is coupled at one end to the crankshaft 246, and at the other, the crosshead 14. The crosshead 14, in turn, is coupled to the pony rod 32 which is coupled to the plunger 256. The connecting rod 248 is connected to the crosshead 14 by a wrist pin 252 inserted through a wrist pin hole 24 formed in both the connecting rod 248 and the crosshead 14. A portion of the connecting rod 248 and the entire crosshead 14 move through the crosshead housing 247. The crosshead housing 249 is found within crosshead case 247. Thus, the crankshaft's 246 rotational movement is transferred through the connecting rod 248 into linear movement. This linear movement, in turn, moves the crosshead 14 and pony rod 32 which in turn moves the plunger 256 in a linear fashion. The crosshead 14 moves through a crosshead housing 247. The crosshead housing 247 in conventional and commercially available frac pumps 12 is a brass cylindrical sleeve 247 that is formed within a steel outside crosshead case 249. When the crosshead 14 moves through the brass sleeve 247, wear occurs to both the crosshead 14 and the brass sleeve 247.

Referring to FIGS. 2 and 3, there is shown a prior art pony rod 32 and crosshead 14 assembly. The crosshead 14 comprises a cylinder portion 16, further comprising a wrist pin hole 24, and a lubrication groove 42. On one end, the pony rod 32 comprises a coupling ring 44 for use in coupling the pony rod 32 to the plunger 256, and, at the other end, a flange portion 48 comprising coupling openings 28 for use in coupling the pony rod 32 to the crosshead 14. In the prior art pony rod 32 and crosshead 14 assembly shown in FIG. 2, one of the parts subject to wear is the pony rod 32. In order to address this wear, it is often necessary to replace the entire pony rod 32 which requires removing the pony rod 32 and crosshead 14 assemblies from the fluid head 264 which, in turn, requires disconnecting the connecting rod 248 from the crankshaft 246.

A First Embodiment

In FIGS. 4, 5, 6 and 7, there is shown a modified pony rod 32 and crosshead 14 assembly in accordance with a preferred embodiment of the present invention. As may be seen in the figures, the crosshead 14 is the conventional and commercially available crosshead 14 shown in FIGS. 2 and 3 and comprises a cylinder portion 16, further comprising a wrist pin hole 24, a lubrication groove 42, and crosshead coupling openings 52 (FIG. 3) for use in coupling the pony rod 32 to the crosshead 14.

The pony rod 32 shown in Figs. FIGS. 4, 5, 6, and 7 is a modified rod pony rod 32 and is an improvement over the conventional pony rod 32 depicted in FIGS. 2 and 3. The pony rod 32 of a preferred embodiment of the present invention comprises a pony rod base 58 comprising a flange 48 and a pony rod shank 56. The flange 48 further comprises coupling openings 28 cooperatively arranged to allow the pony rod base 58 to be coupled to a receiving portion 50 of the crosshead 14 comprising crosshead coupling openings 52. The pony rod shank 56 further comprises a threaded opening 54 structured and arranged to receive a threaded post 64 of the pony rod cap 38. The threaded opening 54 and the threaded post 64 are left hand threaded, meaning that when seen from looking towards the pump 12 on an axis through the center of a helix, the post 64 moves towards the viewer when turned in a clockwise direction, and moves away from the viewer when turned counterclockwise. This left hand threading 64, 54 prevents the pony rod cap 38 from loosening during pump 12 operation. The pony rod shank 56 is cylindrical and is further adapted to receive pony rod sleeve 70. Referring to FIGS. 6 and 7, threaded portions 100 permit the pony rod 32 to be coupled to the crosshead 14. Although in the preferred embodiment pony rod cap 38 comprises threaded post 64 and pony rod shank 56 comprises threaded opening 54, without departing from the spirit and scope of the invention, these elements 54, 64 can easily be reversed such that pony rod shank comprises the threaded post 64 and pony rod cap 38 comprises threaded opening 54.

The pony rod sleeve 70 is tubular and has an inside diameter slightly larger than an outside diameter of the pony rod shank 56. The pony rod sleeve 70 has the same outside diameter as the as conventional pony rod 32 depicted in FIG. 2. The outside surface of the pony rod 32 can be treated in different ways to enhance its wear resistance such as by heat treatment to a high hardness, nitride treatment, or plated to enhance wear with such plating as hard chrome or nickel carbide.

The length of the pony rod sleeve 70 is longer than the stroke of the assembly. This assures that the seal will wear only on the pony rod sleeve 70. Although not required, in the preferred embodiment, the pony rod sleeve 70 preferably extends slightly past the end of the pony rod shank 56 such that when the pony rod sleeve 70 is installed properly, a sufficiently torqued pony rod cap 38, helps hold the pony rod sleeve 70 securely and in proper alignment. If the conventional pony rod cap 38 is damaged the entire pony rod 32 is generally discarded. If the pony rod cap 38 of the present invention is damaged, the pony rod cap 38 may be replaced at a great cost savings.

A bolt 104 with an opposite thread is tightened through the center of the pony rod cap 38 to keep the pony rod cap 38 from loosening. The pony rod sleeve 70 can be replaced in the field without a tear down of the machine 12. Replacement of the pony rod sleeve 70 is fast and very inexpensive compared to the normal replacement method of the entire pony rod 32 in which the pump 12 has to be taken out of service and completely disassembled.

The pony rod base 58 further comprises a flange ring 60 at a junction between the flange 48 and pony rod shank 56. The flange ring 60 has approximately the same size outside diameter as the pony rod sleeve 70 such that when, as shown in FIG. 4, the sleeve 70 is placed in position around the pony rod shank 56, the sleeve 70 and flange ring 60 are flush with one another. However, the pony rod base 58 need not comprises such a flange ring 60. Rather, the pony rod sleeve 70 may directly abut the pony rod base 58.

A Second Embodiment

In FIG. 8, there is shown an exploded view of the modified pony rod 32 and crosshead 14 assembly of FIGS. 9, 10, 11, 12, in accordance with another embodiment of the present invention. As may be seen in the figures, the crosshead 14 comprises a unified crosshead 14 and pony rod shank 56 assembly such that the pony rod 32 and crosshead 14 are integrally formed. The crosshead 14 of this embodiment comprises a cylinder portion 16 comprising a wrist pin hole 24, one or more crosshead extensions 20, and a wear bridge mounting surface 26. The crosshead 14 of this embodiment is adapted to receive at the end closest to the connecting rod 248, one or more rear wear bridges 74a, 74b. Within each crosshead extension 20 are openings 22 for use in coupling the rear wear bridges 74a, 74b to the crosshead 14 through cooperative openings 78. In the preferred embodiment, the rear wear bridges 74a, 74b are partially semi-circular pieces of material comprising arched surfaces 84 having an outside arc approximately the same as an outside arc of the crosshead cylinder 16, and sides 82. When mounted on the crosshead 14, the rear wear bridges 74a, 74b are slightly raised with respect to the crosshead 14 in the areas on the top and bottom of the crosshead 14. The terms "top" and "bottom" refer to the area approximately 90 degrees from the wrist pin hole 24, such that the upper rear wear bridge 74a is positioned at the top and the lower rear wear bridge 74b is positioned at the bottom, as shown in FIG. 8. The rear wear bridge sides 82 nest within cylinder 16 adjacent to the crosshead extensions 20 as shown in FIGS. 9 and 10.

At the end closest to the pony rod shank 56, the crosshead 14 of this embodiment is further adapted to receive one or more front wear bridges 76a, 76b, 76c. The front wear bridges 76a, 76b, 76c may be either semi-circular 76a, 76b (FIG. 10) or full circular 76c (FIG. 9). The front wear bridges 76a, 76b, 76c comprise openings 80 which permit the bridges 76a, 76b, 76c to be secured to the wear bridge mounting surface 26 through openings 72 as shown in FIG. 8. The full circle bridge 76c is adapted for use in applications using brass. In the preferred embodiment, the one or more front wear bridges 76a, 76b, 76c are partially semi-circular pieces of material comprising arched surfaces 84 having an outside arc slightly larger than an outside arc of the crosshead cylinder 16. When mounted on the crosshead 14, the one or more front wear bridges 76a, 76b, 76c are slightly raised with respect to the crosshead 14 in the areas on the top and bottom of the crosshead 14. As best shown in FIGS. 8, 9, 10, 13, 14, 18, and 19 the one or more front wear bridges 76a, 76b, 76c comprise one or more angled portions 75. Such angled portions 75 permit oil or other lubrication substances to be directed between the front wear bridge 76a, 76b, 76c surfaces and the crosshead sleeve 249.

A Third Embodiment

Figure 13:
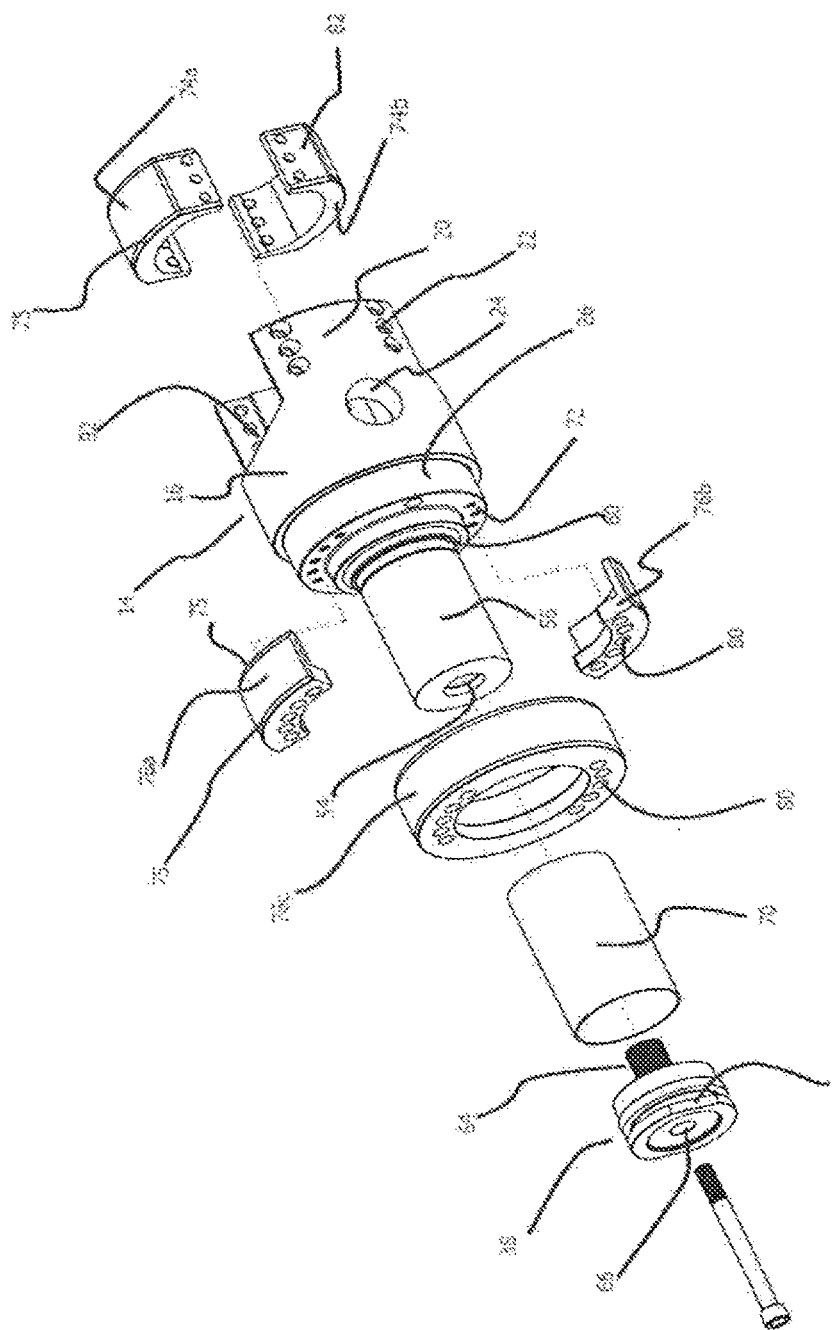
FIG. 13 is an exploded view of the crosshead and pony rod assembly in accordance with another embodiment.
Figures 14, 15:
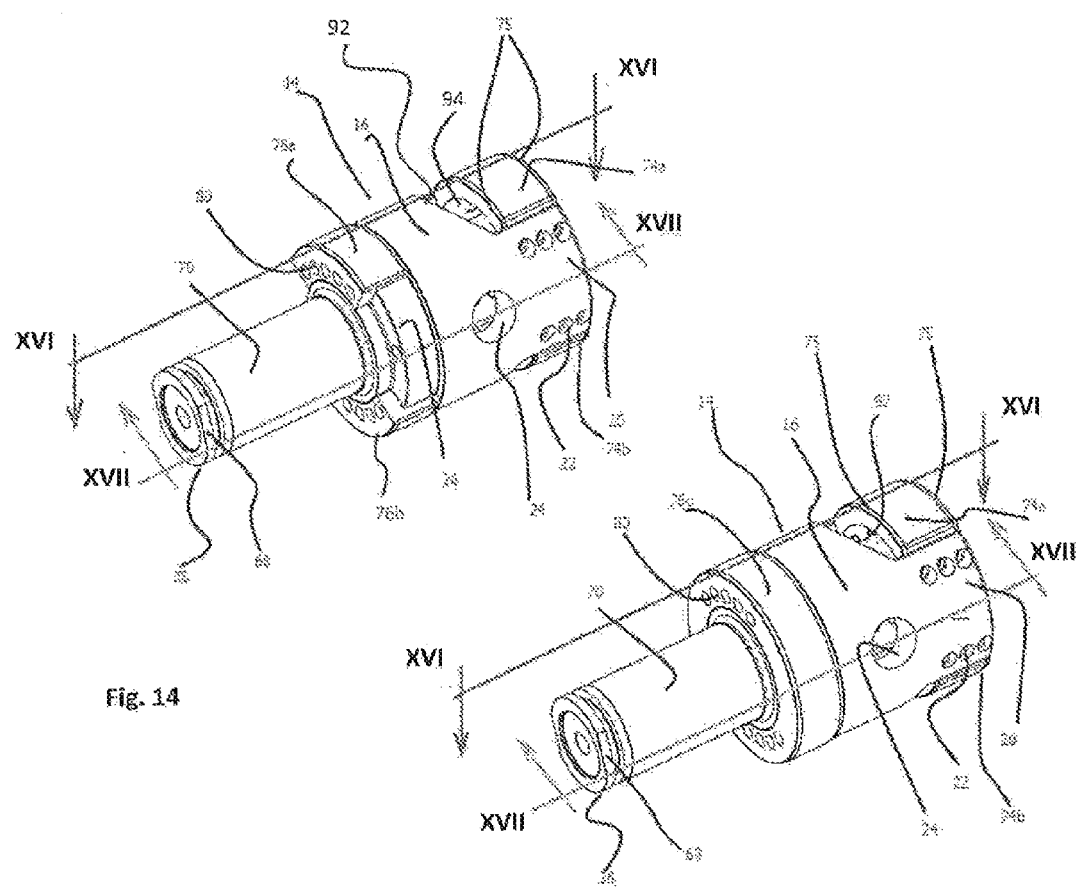
FIGS. 14 and 15 are isometric views of the crosshead and pony rod assembly in accordance with a preferred embodiment.

In FIG. 13, there is shown an exploded view of the modified pony rod 32 and crosshead 14 assembly of FIGS. 14, 15, 16, and 17, in accordance with another embodiment of the present invention. As may be seen in the figures, the crosshead 14 comprises a unified, or single piece, crosshead 14 and pony rod shank 56 assembly. The crosshead 14 comprises a crosshead cylinder portion 16, further comprising a wrist pin hole 24, one or more crosshead extensions 20, a scalloped portion 92, and front wear bridge mounting surface 26. In the embodiment shown in FIGS. 14, 15, 16, and 17, the crosshead cylinder portion 16 has a scalloped portion 92. The crosshead 14 of this embodiment is also adapted to receive one or more wear bridges 76a, 76b, 76c, 74a, 74b, 74c.

Because of the scalloped portion 92 of the cylinder 16, in this embodiment, an opening 94 between the rear wear bridges 74a, 74b, 74c and the cylinder 16 remains on the top and bottom of the crosshead 14 after coupling the cylinder 16 with the rear wear bridge 74a, 74b, 74c.

A Fourth Embodiment

In FIG. 18, there is shown an exploded view of the modified pony rod 32 and crosshead 14 assembly of FIGS. 19 and 20, in accordance with another embodiment. As may be seen in the figures, the crosshead 14 comprises a unified crosshead 14 and pony rod shank 56 assembly. The crosshead 14 comprises a crosshead cylinder portion 16, further comprising a wrist pin hole 24, one or more crosshead extensions 20, a scalloped portion 92, and front wear bridge mounting surface 26.

The crosshead 14 of this embodiment is adapted to receive at the end closest to the connecting rod 248, a circular rear wear bridge 74c. Within each crosshead extension 20 are openings 22 for use in coupling the rear wear bridge 74c to the crosshead 14 through openings 78. The rear wear bridge 74c comprises a rounded surface 84 having an arc slightly larger than an arc of the crosshead cylinder 16 such that when mounted on the crosshead 14, the rear wear bridge 74c is slightly raised with respect to the crosshead 14. Dovetail tails 90 on either side of the rear wear bridge 74c are arranged for cooperative coupling with dovetail pins 88 of the crosshead cylinder 16. Thus, the rear wear bridge 74c of this embodiment is adapted to slide over crosshead extensions 20 and is held securely in a desired position by the dovetail arrangement 88, 90 and coupling devices such as screws placed through openings 78, 22. Because of the scalloped portion 92 of the crosshead cylinder 16, in this embodiment, an opening 94 between the rear wear bridge 74c and the crosshead cylinder 16 remains on the top and bottom of the crosshead 14 after coupling the crosshead cylinder 16 with the rear wear bridge 74c.

The crossheads 14 of the embodiments shown, for example, in FIGS. 19 and 6b are further adapted to receive at the end closest to the pony rod shank 56, one or more front wear bridges 76a, 76b, 76c. The front wear bridges 76a, 76b, 76c may be either semi-circular 76a, 76b or, as shown in FIG. 20, full circular 76c. The front wear bridges 76a, 76b, 76c comprise openings 80 which permit the bridges to be secured to the wear bridge mounting surface 26 through openings 72 as shown in FIGS. 19 and 20. The full circle bridge 76c is adapted for use in applications using brass.

A Fifth Embodiment

Figure 25:
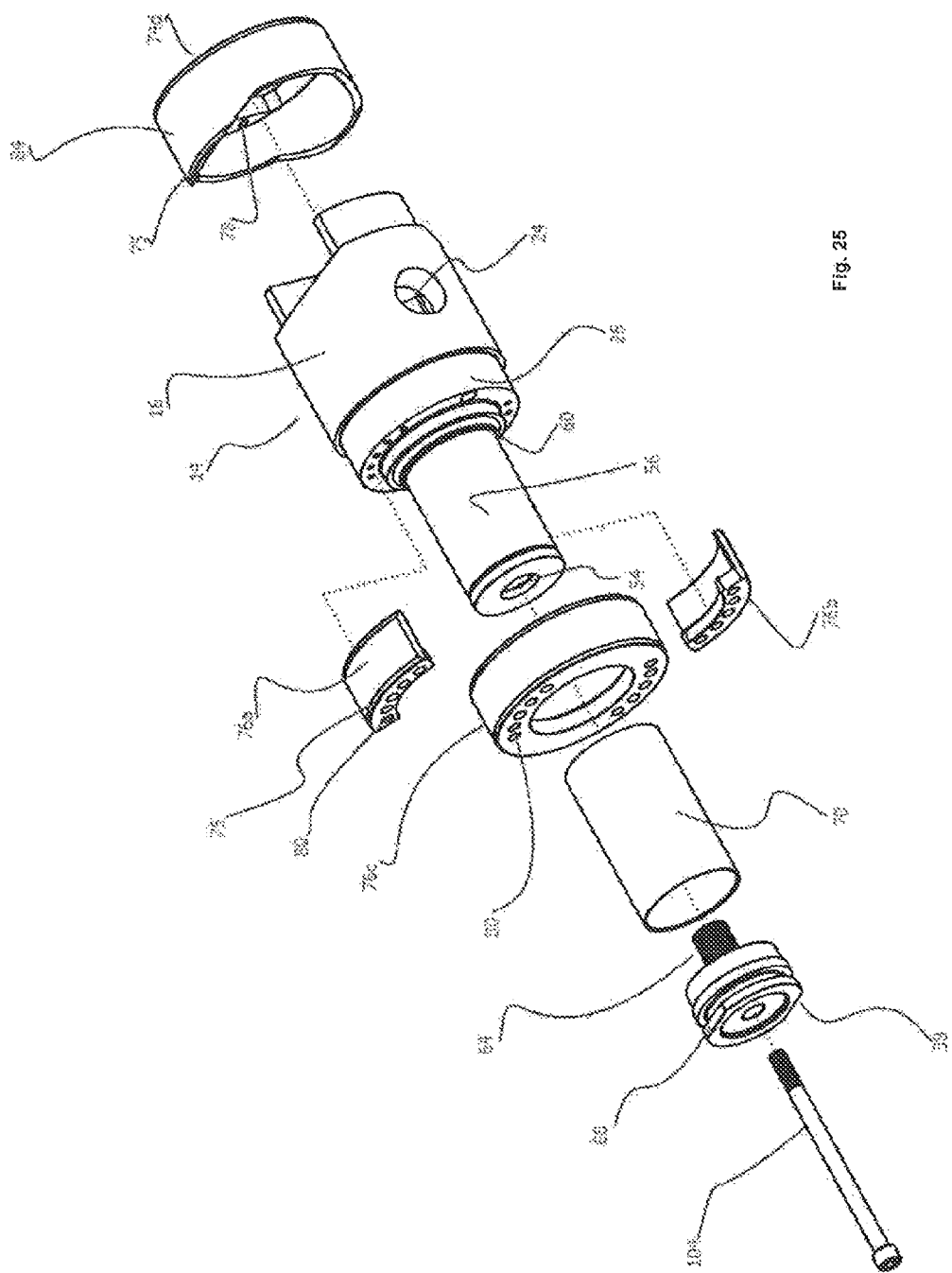
FIG. 25 is an exploded view of the crosshead and pony rod assembly in accordance with a preferred embodiment.

In FIG. 25, there is shown an exploded view of the modified pony rod 32 and crosshead 14 assembly of FIGS. 25-32, in accordance with another embodiment. As may be seen in the figures, the crosshead 14 comprises a unified crosshead 14 and pony rod shank 56 assembly. The crosshead 14 comprises a crosshead cylinder portion 16, further comprising a wrist pin hole 24, one or more crosshead extensions 20, a scalloped portion 92, and front wear bridge mounting surface 26.

The crosshead 14 of this embodiment is adapted to receive at the end closest to the connecting rod 248, a circular rear wear bridge 74c. Within each crosshead extension 27 are rearward openings 22 for use in coupling the rear wear bridge 74d to the crosshead extension 27 through rearward openings 78. The rear wear bridge 74d comprises a rounded surface 84 having an arc slightly larger than an arc of the crosshead cylinder 16 such that when mounted on the crosshead 14, the rear wear bridge 74d is slightly raised with respect to the crosshead 14. Thus, the rear wear bridge 74d of this embodiment is adapted to slide over crosshead extensions 27 and is held securely in a desired position by coupling devices such as screws placed through openings 78, 22 as shown in FIGS. 25-32.

Features Common to Embodiments Shown in FIGS. 4-20 and 25-32

The pony rod 32 of the embodiments shown in FIGS. 4-20 and 25-32 further comprises a pony rod shank 56. As discussed with respect to the embodiment shown in FIGS. 4 and 5, the pony rod shank 56 of the embodiments shown in FIGS. 4-20 and 25-32 further comprises a threaded opening 54 arranged to receive pony rod cap 38 threaded post 64. The internal thread of the threaded opening 54 and the external thread of the threaded post 64 are left handed. The pony rod shank 56 is further adapted to receive pony rod sleeve 70. The pony rod sleeve 70 has an inside diameter slightly larger than an outside diameter of the pony rod shank 56. The pony rod base 58 further comprises a flange ring 60 at the junction between to the wear bridge mounting surface 26 and the pony rod shank 56. The flange ring 60 has approximately the same size outside diameter as the pony rod sleeve 70 such that when, as shown in FIGS. 9, 16, and 19, the sleeve 70 is placed in position around the pony rod shank 60, the sleeve 70 and flange ring 60 are flush with one another.

The pony rod 32 of the embodiments shown in FIGS. 4-20 and 25-32 further comprises a pony rod cap 38. The pony rod cap 38 comprises one or more flat sides 68 adapted to receive a conventional tool such as a wrench or socket and further comprises threaded post 64. As shown in the figures, the rod cap 38 further comprises a pony rod cap face 98 below which a cap bolt 104 may be inserted within pony rod shank opening 96. As best shown in FIGS. 6, 7, 11, 12, 16, and 17, the pony rod cap face 98 comprises a wider mouth 66 portion to accept cap bolt 104. In the preferred embodiment, cap bolt 104 is threaded and helps further secure pony rod cap 38 to the pony rod shank 56. The cap bolt 104 in this embodiment is threaded and extends through the threaded post 64. Opening 96 comprises a wider cylinder portion 106 positioned between a narrower seating 108 and pony rod cap 38.

The pony rod 32 and crosshead 14 assemblies shown in FIGS. 4-20 and 25-32 can be easily repaired without removing the entire pony rod 32 and crosshead 14 assemblies from the fluid head 264 and, thus, it is not necessary to disconnect the connecting rod 248 from the crankshaft 246. Rather, the servicing professional can access the pony rod 32 from the fluid cylinder 260 side of the pump 12. The parts that will be most susceptible to wear will be the pony rod sleeve 70, the front wear bridges 76a, 76b, 76c, and the rear wear bridges 74a, 74b, which are each replaceable parts. The professional can remove the sleeve 70 by removing the pony rod cap 38 from the pony rod shank 56 and sliding the sleeve 70 off. A new sleeve 70 may be placed in position, and the pony rod cap 38 replaced to secure the sleeve 70 in position.

The front wear bridges 76a, 76b, 76c can easily be removed from the wear bridge mounting surface 26 by removing the coupling devices positioned in openings 72, 80. The rear wear bridges 74a, 74b can easily be removed from each crosshead extension 20 by removing the coupling devices positioned in openings are openings 22, 78. The pony rod 32 does not need to be removed from the crosshead 14, and thus, this process is far less time consuming and expensive, and results in the pump 12 not having to be taken out of service for extended periods of time.

Although in preferred embodiments, the one or more front wear bridges 76a, 76b, 76c and the one or more rear wear bridges 74a, 74b, 74c, 74d when mounted on the crosshead 14, are slightly raised with respect to the crosshead 14 in the areas on the top and bottom of the crosshead 14, the wear bridges 76a, 76b, 76c, 74a, 74b, 74c, 74d, need not be so positioned. For example, in the event the crosshead housing 247 would ordinarily need to be re-machined to accommodate the size of the crosshead 14, the need for such repair can be virtually obviated by replacing one or more wear bridges 76a, 76b, 76c, 74a, 74b, 74c, 74d with wear bridges 76a, 76b, 76c, 74a, 74b, 74c, 74d that effectively increase the diameter of the crosshead 14. Replacing the wear bridges 76a, 76b, 76c, 74a, 74b, 74c, 74d with higher profile wear bridges 76a, 76b, 76c, 74a, 74b, 74c, 74d reduces the need to repair or replace the crosshead housing 247.

A Sixth Embodiment

Figure 23:
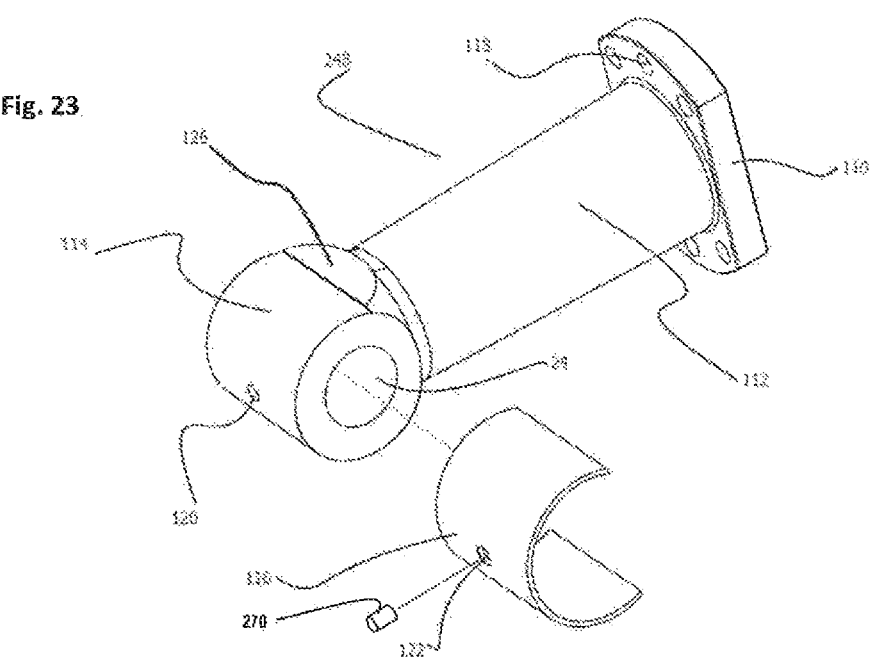
FIG. 23 is an isometric view of the connecting rod in accordance with a preferred embodiment.
Figure 24:
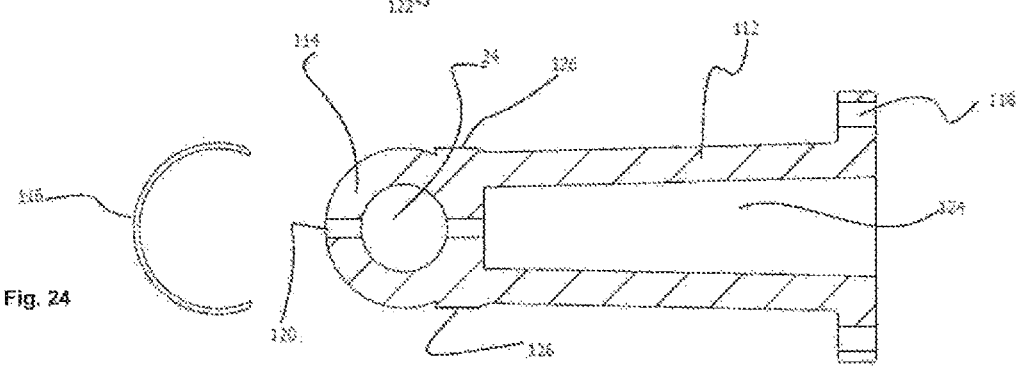
FIG. 24 is a cross sectional view of the connecting rod of FIG. 23.

The modified crosshead 14 assembly shown in FIGS. 18-20 is further adapted to receive a modified connecting rod 248. Referring to FIGS. 23 and 24, there is shown a modified connecting rod 248 in accordance with a preferred embodiment. The connecting rod 248 of this embodiment comprises a connecting plate 110, an elongated portion 112, a wrist pin receiver 114, a wrist pin hole 24, and a wear plate 116. The connecting plate 110 is adapted to be mounted on the crankshaft 246. This plate 110 comprises a plurality of mounting openings 118 adapted to receive threaded bolts, screws, or other suitable mounting devices that may be used to securely couple the connecting rod 248 to the crankshaft 246. The elongated portion 112 spans between the connecting plate 110 and the wrist pin receiver 114. The wrist pin receiver 114 is tubular in shape having a rounded exterior configuration and a hollow interior portion comprising the wrist pin hole 24 adapted to receive a wrist pin 252 which secures the connecting rod 248 to the crosshead 14. The wear plate 116 comprises a "C" shaped configuration with a generally rounded interior surface conforming to the contours of an outside portion of the wrist pin receiver 114 such that the wear plate 116 may be mounted onto the wrist pin receiver 114 with a threaded bolt, screw, or other suitable coupling device 270 inserted within wear plate opening 122 and wrist pin receiver opening 120.

Connecting rod 248 comprises a tapered hollow cylinder 124. In the preferred embodiment, and as shown in FIGS. 23 and 24, an inside diameter of the connecting rod 248 near the wrist pin receiver 114 is narrower than an inside diameter of the connecting rod 248 near the connecting plate 110. The wrist pin receiver 114 further comprises one or more ridges 126 which extend from the outside surface of the wrist pin receiver 114. When the wear plate 116 is mounted on the wrist pin receiver 114, the wear plate 116 ends are flush with these ridges 126 and the wear plate 116 sides are flush with the sides of the wrist pin receiver 114.

Figure 21:
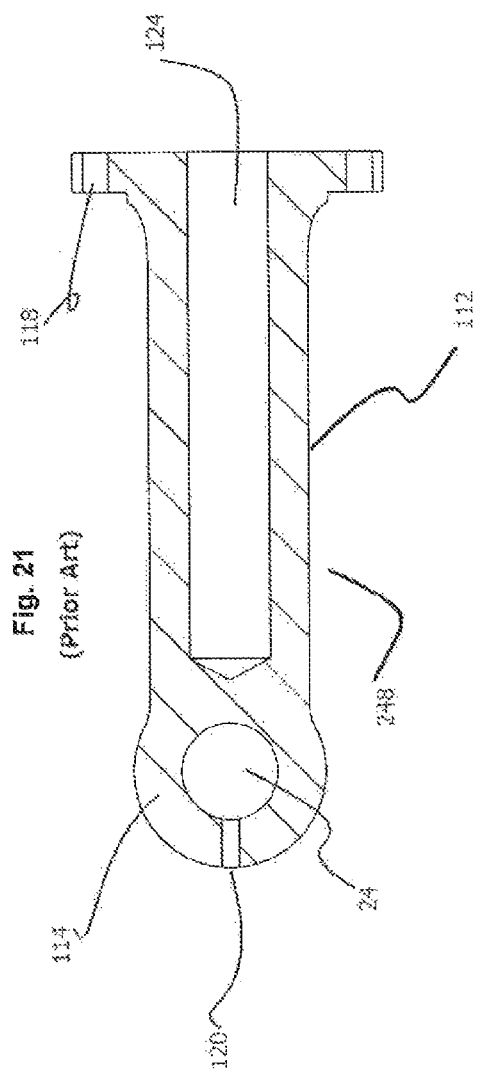
FIG. 21 is a cross sectional view of a prior art connecting rod.
Figure 22:
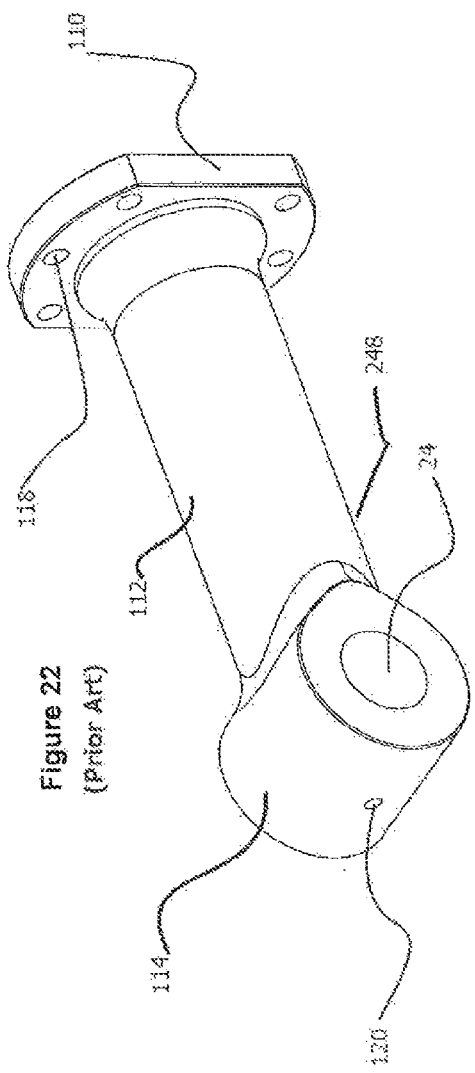
FIG. 22 is an isometric view of a prior art connecting rod.

On conventional connecting rods 248 (FIGS. 21 and 22) the wrist pin receiver (male knuckle) 114 is likely to deteriorate after extended periods of use. Correction of this deterioration generally requires replacement of the connecting rod 248 which is time consuming and expensive. The wear plate 116 provided in this invention is an expendable part which may be replaced after extended use of the frac pump 12.

A Seventh Embodiment

In an embodiment of the present invention, a reciprocating pump 12 comprises a crankshaft 246, a connecting rod 248, a crosshead 14, a pony rod 32, and a plunger 256. The plunger 256 pumps fluid through the fluid cylinder chamber 260. The plunger 256 is connected, at one end, to the pony rod 32. The pony rod 32 is connected to the crosshead 14. The crosshead 14 is connected to the connecting rod 248 which is connected to the crankshaft 246. The connecting rod 248, crosshead 14, pony rod 32, and plunger 256 are moved linearly by the crankshaft's 246 rotational movement. The crosshead 14 comprises a multi-piece assembly. Referring to the figures, the crosshead 14 comprises a cylinder portion 16, a wrist pin hole 24, one or more threaded openings, an integrated pony rod 32.

In various aspects of this embodiment, the reciprocating pump 12 may comprise the multi-piece pony rod 32 assembly as well as several other of the assemblies discussed in relation to other embodiments. For example, the pony rods 32 may comprise an integral part of the crossheads 14 such that the pony rod shanks 56 are fixed to the respective crossheads 14. The crossheads 14 may comprise one or more rear wear bridges 74a, 74b, 74c, 74d. Such one or more rear wear bridges 74a, 74b, 74c, 74d may be cooperatively coupled with one or more crosshead extension members. The crossheads 14 may comprise forward wear bridges 76a, 76b, 76c. The crossheads 14 may comprise forward mounting portions 26. The pony rods 32 may comprise an outer sleeve 70, and/or a pony rod cap 38 which may be threaded into a threaded shank portion 56. The pony rod cap 38 may have an outside configuration comprising one or more flat sides 68.

The operation and use of the pony rod 32 and crosshead 14 assembly of a preferred embodiment will now be described. The pony rod 32 comprising a pony rod base 58 comprising a flange 48 and a pony rod shank 56 is coupled to receiving portion 50 of the crosshead 14. The pony rod sleeve 70 is placed about the pony rod shank 56 such that the pony rod shank 56 is positioned within the pony rod sleeve 70. The pony rod cap 38 threaded post 64 is left-hand threaded into the pony rod shank 56 threaded opening 54 such that the pony rod sleeve 70 is maintained in position on the pony rod shank 56. One or more rear wear bridges 74a, 74b, 74c, 74d and front wear bridges 76a, 76b, 76c are positioned on the crosshead 14 such that when mounted on the crosshead 14, the wear bridges 76a, 76b, 76c, 74a, 74b, 74c, 74d are slightly raised with respect to the crosshead 14 in the areas on the top and bottom of the crosshead 14.

Methods

A method of repairing a pump is provided, the method comprising the steps of: providing a pony rod 32 comprising a pony rod base 58 comprising a flange 48 and a pony rod shank 56; the a pony rod shank 56 being coupled to a receiving portion 50 of the crosshead 14; a first pony rod sleeve 70 being positioned about the pony rod shank 56 such that the pony rod shank 56 is within a hollow portion of said first pony rod sleeve 70; a pony rod cap 38 threaded post 64 being threaded into the pony rod shank 56 threaded opening 54; removing the pony rod cap 38 from the pony rod shank 56; removing the first pony rod sleeve 70 from the pony rod shank 56; placing a second pony rod sleeve 70 about the pony rod shank 56 such that the pony rod shank 56 is within a hollow portion of said second pony rod sleeve 70; and replacing the a pony rod cap 38.

In another embodiment, a method of repairing a pump is provided, the method comprising the steps of providing a crosshead 14 comprising a crosshead cylinder portion 16 comprising a wrist pin hole 24, a wear bridge mounting surface 26; the crosshead 14 having a first rear wear bridge 74a, 74b, 74c, 74d mounted on the wear bridge mounting surface 26; removing the first rear wear bridge 74a, 74b from said wear bridge mounting surface 26; and mounting a second rear wear bridge 74a, 74b on said wear bridge mounting surface 26.

In another embodiment, a method of repairing a pump is provided, the method comprising the steps of providing a crosshead 14 comprising a crosshead cylinder portion 16 comprising a wrist pin hole 24, a wear bridge mounting surface 26; the crosshead 14 having a first front wear bridge 76a, 76b, 76c, mounted on the wear bridge mounting surface 26; removing the first front wear bridge 76a, 76b, 76c, from said wear bridge mounting surface 26; and mounting a second front wear bridge 76a, 76b, 76c on said wear bridge mounting surface 26.

Changes and Modifications

While there has been illustrated and described what is, at present, considered to be a preferred embodiment of the present invention, it will be understood by those skilled in the art that various changes and modifications may be made, and equivalents may be substituted for elements thereof without departing from the true scope of the invention. Therefore, it is intended that this invention not be limited to the particular embodiment disclosed as the best mode contemplated for carrying out the invention, but that the invention will include all embodiments falling within the scope of the appended claims. For example, while the pony rod 32, connecting rod 248, and crosshead 14 are machined from a solid bar of 4140 steel, they need not be so composed or manufactured. Likewise, although the various wear bridges 76a, 76b, 76c, 74a, 74b, 74c, 74d described herein are machined from 17-4 Precipitation Hardening (17-4 PH) stainless steel (also known as Type 630), a chromium-copper precipitation hardening stainless steel conventionally used for applications requiring high strength and corrosion resistance, the wear bridges need not be so composed or manufactured. Rather, the pony rod 32, connecting rod 248, crosshead 14, and wear bridges 76a, 76b, 76c, 74a, 74b, 74c, 74d may be made from any conventional and otherwise suitable materials and may be shaped with by other manufacturing methods without departing from the scope and spirit of the invention.

I claim:

1. A pony rod assembly comprising a pony rod, a protective sleeve, a pony rod cap, and a fastener;
    the pony rod comprising first and second ends, said pony rod first end adapted for removable coupling to a crosshead assembly, said pony rod second end comprising a pony rod central opening;

the pony rod cap comprising pony rod cap first and second ends, said pony rod cap first end comprising a pony rod cap post adapted for insertion within the pony rod central opening;

the pony rod cap second end comprising a pony rod cap central through opening, the pony rod cap central through opening extending coaxially between the pony rod cap first and second ends and coaxially through the pony rod post;

the fastener comprising an elongated member extending coaxially through the pony rod cap central through opening and the pony rod central opening, such that the fastener removably couples the pony rod cap to the pony rod.

2. The pony rod assembly of claim 1, the pony rod cap post and pony rod central opening being cooperatively threaded.

3. The pony rod assembly of claim 2 wherein said cooperative threading comprises left hand threading.

4. The pony rod assembly of claim 2 wherein said pony rod cap further comprises one or more flat sides structured and arranged to permit said pony rod cap to be turned with a conventional wrench.

5. The pony rod assembly of claim 1,
said pony rod cap central opening comprising a diameter that is less than a diameter of a head portion of the fastener.

6. The pony rod assembly of claim 1, said pony rod cap comprising an annular groove adjacent to said pony rod cap second end.

7. A crosshead having a longitudinal axis comprising a plurality of longitudinal positions, the crosshead further comprising:
a cylindrical main body comprising a wrist pin opening, first and second crosshead extension portions, a plurality of fasteners, and first and second wear bridges, the wrist pin opening being positioned at a wrist pin opening longitudinal position;
the first and second crosshead extension portions each extending longitudinally from said cylindrical main body from one or more extension portion longitudinal positions and defining first and second spaces between the first and second crosshead extension portions, the first and second spaces being circumferential to the crosshead longitudinal axis, the one or more extension portion longitudinal positions each being different from the wrist pin opening longitudinal position;
the first and second crosshead extension portions each comprising one or more mounting surfaces for removable coupling of said first and second wear bridges;
at least one of said plurality of fasteners coupling the first wear bridge to the one or more mounting surfaces of the first extension portion;
at least one of said plurality of fasteners coupling the first wear bridge to the one or more mounting surfaces of the second extension portion;
at least one of said plurality of fasteners coupling the second wear bridge to the one or more mounting surfaces of the first extension portion;
at least one of said plurality of fasteners coupling the second wear bridge to the one or more mounting surfaces of the second extension portion;
the first wear bridge spanning the first space, the second wear bridge spanning the second space.

8. The crosshead of claim 7 wherein at least one of said first and second wear bridges comprises a contoured portion capable of directing a lubrication substance.

9. The crosshead of claim 7 wherein an outside surface of each of the first and second wear bridges is raised with respect to a crosshead main body outside surface.

10. The crosshead of claim 7 further comprising an integrated pony rod.

11. The crosshead of claim 10, the pony rod comprising a removably coupled pony rod sleeve.

12. The crosshead of claim 11 further comprising:
a third wear bridge;
a front mounting portion, said front mounting portion being positioned between the pony rod and main body portion; and
the third wear bridge being removably coupled to the front mounting portion.

13. The crosshead of claim 7 wherein said crosshead comprises a scalloped portion.

14. A crosshead having a longitudinal axis comprising a plurality of longitudinal positions, the crosshead further comprising:
a cylindrical main body comprising a wrist pin opening, first and second crosshead extension portions, a plurality of fasteners, one or more wear bridges;
the wrist pin opening being positioned at a wrist pin opening longitudinal position;
the first and second crosshead extension portions each extending longitudinally from said cylindrical main body from one or more extension portion longitudinal positions, the one or more extension portion longitudinal positions each being different from the wrist pin opening longitudinal position;
the first and second crosshead extension portions each comprising one or more mounting surfaces for removable coupling of said one or more wear bridges; and
at least one of said plurality of fasteners coupling at least one of said one or more wear bridges to the one or more mounting surfaces of the first and second extension portions such that said at least one of the one or more wear bridges is circumferentially disposed about the crosshead longitudinal axis.

15. The crosshead of claim 14 further comprising a substantially integrated pony rod.

16. The crosshead of claim 15 wherein a pony rod cap and the pony rod are cooperatively threaded for removable coupling of said pony rod cap to said pony rod.

17. The crosshead of claim 16 wherein the threaded portion of said pony rod cap comprises a post and the threaded portion of said pony rod comprises a threaded opening.

18. The crosshead of claim 16 wherein said threaded portions comprise left hand threading.

19. The crosshead of claim 16 wherein said pony rod cap further comprises one or more flat sides structured and arranged to permit said pony rod cap to be turned with a conventional wrench.

20. The crosshead of claim 15 further comprising:
a front mounting portion, said front mounting portion being positioned between a pony rod shank of the pony rod and the main body portion;
at least one of said one or more wear bridges being removably coupled to the front mounting portion.

21. A connecting rod assembly comprising:
an elongated portion, a wrist pin receiver, and a crankshaft connecting portion, said elongated portion extending between the wrist pin receiver and the crankshaft connecting portion, the elongated portion comprising a tapered outside configuration such that a connecting rod circumference is greater near the crankshaft connecting portion than near the wristpin receiver;

an outer surface of the wrist pin receiver comprising a fastener opening such that the wrist pin receiver is adapted for coupling to a wear plate wherein, using the fastener opening, said wear plate is removably coupled by the fastener to an outside surface of the wrist pin receiver.

22. The connecting rod assembly of claim 21, further comprising a connecting plate, said connecting plate being adapted to be mounted on a crankshaft, the elongated portion being positioned between said connecting plate and the wrist pin receiver; the wear plate comprising a generally rounded interior surface conforming to the contours of a portion of the wrist pin receiver.

23. A reciprocating pump assembly, comprising:
a pump housing that houses a crank shaft;
a plunger for pumping fluid through a cylinder, the cylinder having fluid ports for ingress and egress of fluids;
a crosshead coupled by a pony rod assembly to the plunger and moveable longitudinally within a crosshead housing;
a connecting rod coupled to the crankshaft at a crosshead first end, and pivotally secured to the crosshead at a crosshead second end;
the pony rod assembly comprising a pony rod, a protective sleeve, a pony rod cap, and a fastener;
said protective sleeve being removably coupled to the pony rod;
the pony rod comprising first and second ends, said pony rod first end adapted for removable coupling to the crosshead, said pony rod second end comprising a pony rod central opening;
the pony rod cap comprising pony rod cap first and second ends, said pony rod cap first end comprising a pony rod cap post adapted for insertion within the pony rod central opening;
the pony rod cap second end comprising a pony rod cap central through opening, the pony rod cap central through opening extending between the pony rod cap first and second ends and coaxially through the pony rod post;
the fastener comprising an elongated member extending coaxially through the pony rod cap central through opening and the pony rod central opening, such that the fastener removably couples the pony rod cap to the pony rod.

24. A method of repairing a pump, the method comprising the steps of:
providing a pump comprising a pony rod assembly and a crosshead;
the pony rod assembly comprising a pony rod, a first protective sleeve, a pony rod cap, and a fastener;
said first protective sleeve being removably coupled to the pony rod;
the pony rod comprising first and second ends, said pony rod first end adapted for removable coupling to the crosshead, said pony rod second end comprising a pony rod central opening;
the pony rod cap comprising pony rod cap first and second ends, said pony rod cap first end comprising a pony rod cap post adapted for insertion within the pony rod central opening;
the pony rod cap second end comprising a pony rod cap central through opening, the pony rod cap central through opening extending between the pony rod cap first and second ends and coaxially through the pony rod post;
the fastener comprising an elongated member extending coaxially through the pony rod cap central through opening and the pony rod central opening, such that the fastener removably couples the pony rod cap to the pony rod;
providing a second protective sleeve;
removing the pony rod cap;
removing the first protective sleeve from the pony rod;
positioning the second protective sleeve coaxially about the pony rod such that the pony rod is within a hollow portion of said second protective sleeve; and
replacing the pony rod cap.

25. The method of repairing a pump of claim 24, the crosshead having a longitudinal axis comprising a plurality of longitudinal positions, the crosshead further comprising:
a cylindrical main body comprising a wrist pin opening, first and second crosshead extension portions, a plurality of fasteners, and first and second wear bridges, the wrist pin opening being positioned at a wrist pin opening longitudinal position;
the first and second crosshead extension portions each extending longitudinally from said cylindrical main body from one or more extension portion longitudinal positions and defining first and second spaces between the first and second crosshead extension portions, the first and second spaces being circumferential to the crosshead longitudinal axis, the one or more extension portion longitudinal positions each being different from the wrist pin opening longitudinal position;
the first and second crosshead extension portions each comprising one or more mounting surfaces for removable coupling of said first and second wear bridges;
at least one of said plurality of fasteners coupling the first wear bridge to the one or more mounting surfaces of the first extension portion;
at least one of said plurality of fasteners coupling the first wear bridge to the one or more mounting surfaces of the second extension portion;
at least one of said plurality of fasteners coupling the second wear bridge to the one or more mounting surfaces of the first extension portion;
at least one of said plurality of fasteners coupling the second wear bridge to the one or more mounting surfaces of the second extension portion;
the first wear bridge spanning the first space, the second wear bridge spanning the second space;
the method further comprising the steps of:
removing said first and second wear bridges from said one or more mounting surfaces;
mounting one or more replacement wear bridges on said one or more mounting surfaces.

26. A method of repairing a pump, the method comprising the steps of:
providing a pump comprising a connecting rod, the connecting rod comprising an elongated portion, a wrist pin receiver, and a crankshaft connecting portion, said elongated portion extending between the wrist pin receiver and the crankshaft connecting portion, the elongated portion comprising a tapered outside configuration such that a connecting rod circumference is greater near the crankshaft connecting portion than near the wrist pin receiver, an outer surface of the wrist pin receiver being removably coupled by a fastener to a first wear plate;

providing a second wear plate;
removing the first wear plate from said wrist pin receiver; and
coupling a second wear plate to the outer surface of the wrist pin receiver.

27. The method of repairing a pump of claim 26, each of the wear plates comprising a generally rounded interior surface conforming to the contours of an outside portion of the wrist pin receiver, such that said wear plate may be removably coupled to said wrist pin receiver.

* * * * *